United States Patent
Koo et al.

(10) Patent No.: US 11,513,591 B2
(45) Date of Patent: Nov. 29, 2022

(54) WEARABLE DEVICE INCLUDING EYE TRACKING APPARATUS AND OPERATION METHOD OF THE WEARABLE DEVICE

(71) Applicant: SAMSUNG ELECTRONICS CO., LTD., Suwon-si (KR)

(72) Inventors: Bonkon Koo, Suwon-si (KR); Jaewoo Ko, Suwon-si (KR); Soonseob Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 17/126,459

(22) Filed: Dec. 18, 2020

(65) Prior Publication Data
US 2021/0191511 A1    Jun. 24, 2021

(30) Foreign Application Priority Data
Dec. 20, 2019 (KR) .................. 10-2019-0171916

(51) Int. Cl.
| | | |
|---|---|---|
| G06F 3/01 | (2006.01) | |
| G06T 11/00 | (2006.01) | |
| G06V 10/44 | (2022.01) | |
| G06V 40/18 | (2022.01) | |

(52) U.S. Cl.
CPC ............. *G06F 3/013* (2013.01); *G06T 11/00* (2013.01); *G06V 10/443* (2022.01); *G06V 40/193* (2022.01)

(58) Field of Classification Search
CPC .... G06F 3/013; G06V 10/443; G06V 40/193; G06T 11/00
See application file for complete search history.

(56) References Cited

U.S. PATENT DOCUMENTS

| | | |
|---|---|---|
| 6,717,578 B1 | 4/2004 | Deering |
| 8,878,749 B1 | 11/2014 | Wu et al. |
| 9,129,277 B2 | 9/2015 | MacIntosh |
| 9,986,170 B2 | 5/2018 | Shin et al. |
| 10,156,899 B2 | 12/2018 | Lopez |
| 10,213,105 B2 | 2/2019 | Sarkar |
| 10,296,792 B2 | 5/2019 | Spizhevoy et al. |
| 10,341,647 B2 | 7/2019 | Koesters et al. |
| 2013/0176533 A1 | 7/2013 | Raffle et al. |

(Continued)

FOREIGN PATENT DOCUMENTS

KR    10-2019-0028493 A    3/2019

OTHER PUBLICATIONS

Holmström, S.T.S., et al., "MEMS Laser Scanners: A Review", Journal of Microelectromechanical Systems, vol. 23, No. 2, Apr. 2014, DOI: 10.1109/JMEMS.2013.2295470, 1 page.

(Continued)

*Primary Examiner* — Robert J Michaud
(74) *Attorney, Agent, or Firm* — Sughrue Mion, PLLC

(57) ABSTRACT

An eye tracking apparatus includes: a light source module including a light source and a scanning mirror, the light source being configured to provide light toward an eye region of a user while a direction of the light is changed at intervals of a predetermined time period under control of the scanning mirror; and a dynamic vision sensor (DVS) camera module configured to generate an image based on a variation in an amount of light reflected from the eye region of the user.

19 Claims, 26 Drawing Sheets

(56) References Cited

U.S. PATENT DOCUMENTS

| | | | |
|---|---|---|---|
| 2014/0002349 A1* | 1/2014 | Hansen | G06T 7/246 345/156 |
| 2016/0093273 A1 | 3/2016 | Wang et al. | |
| 2016/0166146 A1* | 6/2016 | Sarkar | G02B 26/101 351/210 |
| 2017/0115742 A1 | 4/2017 | Xing et al. | |

OTHER PUBLICATIONS

"Microscanner", Microscanner-Wikipedia, https://en.wikipedia.org/wiki/Microscanner, Sep. 29, 2020, pp. 1-5.

International Search Report dated Apr. 1, 2021, issued by the International Searching Authority in International Application No. PCT/KR2020/018725 (PCT/ISA/220, 210, 237).

* cited by examiner

WEARABLE DEVICE INCLUDING EYE TRACKING APPARATUS AND OPERATION METHOD OF THE WEARABLE DEVICE

CROSS-REFERENCE TO RELATED APPLICATION

This application is based on and claims priority under 35 U.S.C. § 119 to Korean Patent Application No. 10-2019-0171916, filed on Dec. 20, 2019, in the Korean Intellectual Property Office, the disclosure of which is incorporated by reference herein in its entirety.

BACKGROUND

1. Field

The disclosure relates to eye tracking apparatuses, wearable devices including an eye tracking apparatus, operation methods of the eye tracking apparatus, and operation methods of the wearable devices including the eye tracking apparatus, and more particularly, to an eye tracking apparatus for tracking a user's view by using a dynamic vision sensor (DVS) image, an operation method thereof, a wearable device including the eye tracking apparatus, and an operation method of the wearable device including the eye tracking apparatus.

2. Description of the Related Art

With the recent development of technologies, wearable devices that are wearable on human bodies have been provided in various forms. Among them, a glasses-type wearable device including a head mounted display is a wearable device to be worn on a user's head and is capable of providing an augmented reality (AR) service to the user by providing visual information about a virtual object through a display.

When this wearable device is used, a user's view may be used for an interaction between either a virtual object on the display or an actual object present in a real-world space and the user. Accordingly, there is a demand for technologies for tracking a user's view by tracking a user's eye with low power and at high speed while being resilient to variations in illumination.

SUMMARY

Provided are a wearable device capable pf tracking a user's view by using a dynamic vision sensor (DVS) image, and an operation method thereof.

Provided are a wearable device capable of detecting respective positions of a cornea and a pupil of a user, and an operation method thereof.

Provided are non-transitory computer-readable recording medium having recorded thereon a computer program, which, when executed by at least one processor, causes the at least one processor to perform the above method(s). Technical problems to be solved are not limited to those described above and other technical problems may be present.

Additional aspects will be set forth in part in the description which follows and, in part, will be apparent from the description, or may be learned by practice of the presented embodiments of the disclosure.

In accordance with an aspect of the disclosure, there is provided an eye tracking apparatus, including: a light source module including a light source and a scanning mirror, the light source being configured to provide light toward an eye region of a user while a direction of the light is changed at intervals of a predetermined time period under control of the scanning mirror; and a dynamic vision sensor (DVS) camera module configured to generate an image based on a variation in an amount of light reflected from the eye region of the user.

The scanning mirror may be further configured to change the direction of the light by controlling to change a direction in which the light is projected from the light source toward the eye region along at least one of a longitudinal straight line, a transverse straight line, or a Lissajous curve.

In accordance with an aspect of the disclosure, there is provided a wearable device including: a light source module including a light source and a scanning mirror, the light source configured to provide light toward an eye region of a user and the scanning mirror configured to control to change a direction of the light from the light source at intervals of a predetermined time period; a dynamic vision sensor (DVS) camera module configured to generate an image based on a variation in an amount of light reflected from the eye region of the user; and a processor configured to detect a cornea region of an eye of the user from the image.

The processor may be further configured to detect a movement of the cornea region by using a plurality of images consecutively generated by the DVS camera module based on variations in an amount of light reflected from one or more points of the eye region.

The processor may be further configured to track a change in a position of the detected cornea region based on the plurality of images consecutively generated by the DVS camera module.

The processor may be further configured to detect a pupil region of the user from the image, based on the detected cornea region.

The processor may be further configured to filter a peripheral region outside the cornea region from the image and detect the pupil region based on a result of filtering.

The processor may be further configured to: store a position of the detected pupil region in a memory; and based on a change in the position of the detected pupil region, update the position of the detected pupil region and store the updated position in the memory.

The processor may be further configured to, based on the pupil region not being detected in the image, estimate a current position of the pupil region, based on the position of the pupil region stored in the memory.

The processor may be further configured to: determine a direction of a view of the eye based on a position of the cornea region and the position of the pupil region, and store the positions of the cornea region and the pupil region and the determined direction of the view in a memory.

The processor may be further configured to track a change in the direction of the view based on a plurality of images consecutively generated by the DVS camera module.

In accordance with an aspect of the disclosure, there is provided a method of operating a wearable device, the method including: providing light from a light source toward an eye region of a user while changing a direction of the light at intervals of a predetermined time period by using a scanning mirror; and generating an image by using a dynamic vision sensor (DVS) camera module, based on a variation in an amount of light reflected from the eye region of the user.

The method may further include detecting a cornea region of an eye of the user from the image.

The method may further include detecting a movement of the cornea region by using a plurality of images consecutively generated by the DVS camera module based on variations in an amount of light reflected from one or more points of the eye region.

The method may further include tracking a change in a position of the detected cornea region, based on the plurality of images consecutively generated by the DVS camera module.

The method may further include detecting a pupil region of the user from the image, based on the detected cornea region.

The method may further include storing a position of the detected pupil region in a memory, and based on a change in the position of the detected pupil region, updating the position of the detected pupil region and storing the updated position in the memory.

The method may further include, based on the pupil region not being detected from the image, estimating a current position of the pupil region, based on the position of the pupil region stored in the memory.

The method may further include determining a direction of a view of the eye, based on a position of the cornea region and the position of the pupil region, and storing the positions of the cornea region and the pupil region and the determined direction of the view in the memory.

The detecting the pupil region may include filtering a peripheral region outside the cornea region from the image based on the detected cornea region.

In accordance with an aspect of the disclosure, there is provided a non-transitory computer-readable recording medium having recorded thereon a computer program for executing the above-described operation method(s).

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
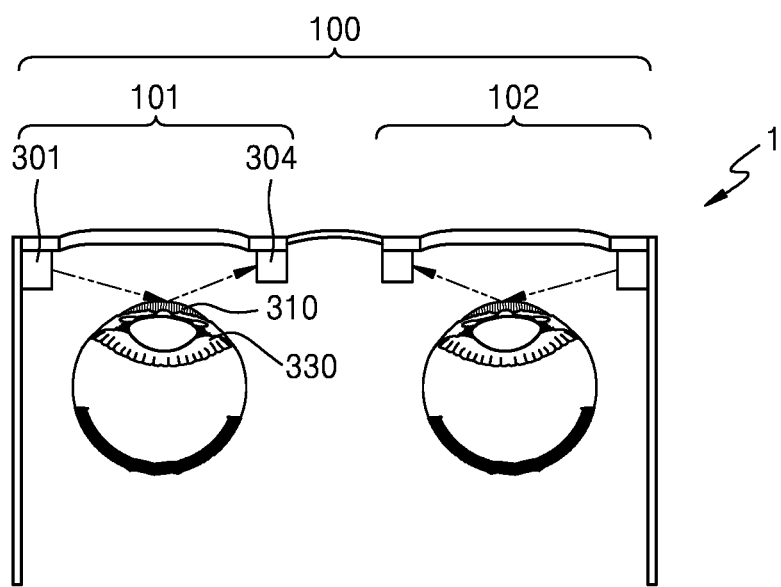
FIG. 1 is a view for schematically describing an eye tracking apparatus mounted on a wearable device, according to an embodiment.

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the examples set forth herein. In the drawings, parts irrelevant to the description are omitted for simplicity of explanation, and like numbers refer to like elements throughout.

Although general terms widely used at present were selected for describing the disclosure in consideration of the functions thereof, these general terms may vary according to intentions of one of ordinary skill in the art, case precedents, the advent of new technologies, and the like. Hence, the terms used herein are defined based on their meanings in relation to the contents of the entire specification, not by their simple meanings.

Throughout the disclosure, the expression "at least one of a, b or c" indicates only a, only b, only c, both a and b, both a and c, both b and c, all of a, b, and c, or variations thereof.

While such terms as "first," "second," etc., may be used to describe various components, such components must not be limited to the above terms. The above terms are used only to distinguish one component from another.

The terms used in the present specification are merely used to describe particular embodiments of the disclosure, and are not intended to limit the scope of the disclosure. An expression used in the singular encompasses the expression of the plural, unless it has a clearly different meaning in the context. Throughout the specification, when an element is referred to as being "connected" or "coupled" to another element, it may be directly connected or coupled to the other element, or may be electrically connected or coupled to the other element with intervening elements interposed therebetween. In addition, the terms "comprise" and/or "comprising" or "includes" and/or "including" when used in this disclosure, specify the presence of stated elements, but do not preclude the presence or addition of one or more other elements.

The use of the terms "a" and "an" and "the" and similar referents in the context of describing the disclosure (especially in the context of the following claims) are to be construed to cover both the singular and the plural. Also, operations or steps of any method described herein may be performed in any suitable order unless otherwise indicated herein or otherwise clearly contradicted by context. Embodiments of the disclosure are not limited to the described order of the operations.

Thus, the expression "according to an embodiment of the disclosure" used in the entire disclosure does not necessarily indicate the same embodiment of the disclosure.

Embodiments of the disclosure may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a certain function. In addition, for example, functional blocks according to the disclosure may be implemented with any programming or scripting language. The functional blocks may be implemented in algorithms that are executed on one or more processors. Furthermore, the disclosure described herein could employ any number of conventional techniques for electronics configuration, signal processing and/or control, data processing and the like. The words "mechanism," "element," "means," and "configuration" are used broadly and are not limited to mechanical or physical embodiments of the disclosure, Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

The use of any and all examples, or exemplary language (e.g., "for example" and "such as") provided herein, is intended merely to better illuminate the disclosure and does not pose a limitation on the scope of the disclosure unless otherwise claimed.

Moreover, no item or component is essential to the practice of the disclosure unless the element is specifically described as "essential" or "critical".

It will be understood by those of ordinary skill in the art that various changes in form and details may be made to the embodiment of the disclosure without departing from the intrinsic characteristics of the above descriptions.

As the disclosure allows for various changes and numerous embodiments of the disclosure, particular embodiments of the disclosure will be illustrated in the drawings and described in detail in the written description. However, this is not intended to limit the disclosure to particular modes of practice, and it is to be appreciated that all changes, equivalents, and substitutes that do not depart from the spirit and technical scope are encompassed in the disclosure. Thus, it should be understood that the disclosed embodiments of the disclosure should be considered in a descriptive sense only and not for purposes of limitation.

While one or more example embodiments of the disclosure have been described with reference to the figures, it will be understood by one of ordinary skill in the art that various changes in form and details may be made therein without departing from the spirit and scope as defined by the following claims.

The terms "unit", "-er (-or)", and "module" when used in this specification refers to a unit in which at least one function or operation is performed, and may be implemented as hardware, software, or a combination of hardware and software.

The terms " . . . or(er)", " . . . interface", and " . . . module" may be stored in an addressable storage medium and may be implemented by a program that may be executed by a processor.

For example, the " . . . or(er)", " . . . interface", and " . . . module" may be implemented by object-oriented software components, class components, and task components, and processes, functions, attributes, procedures, subroutines, segments of a program code, drivers, firmware, a micro code, a circuit, data, a database, data structures, tables, arrays, and variables.

In this specification, a recitation "A may include one of a1, a2, and a3" broadly means that an exemplary element that may be included in the element A is a1, a2, or a3.

The above recitation does not necessarily imply that an element capable of constituting the element A is limited to a1, a2 or a3. Thus, it should be noted that elements that may constitute A are not exclusively interpreted in the sense that they exclude other elements not illustrated except a1, a2 and a3.

In addition, the above recitation means that A may include a1, include a2, or include a3. The above recitation does not imply that elements constituting A are necessarily determined within a given set. For example, it should be noted that the above recitation does not necessarily construe that a1, a2, or a3 selected from a set including a1, a2, and a3 constitutes component A.

The disclosure will now be described more fully with reference to the accompanying drawings, in which exemplary embodiments of the disclosure are shown.

FIG. 1 is a view for schematically describing an eye tracking apparatus 100 mounted on a wearable device 1 according to an embodiment.

The eye tracking apparatus 100 according to an embodiment may include a first eye tracker 101 for tracking the view of a user's left eye and a second eye tracker 102 for tracking the view of a user's right eye.

FIG. 1 illustrates an example where the eye tracking apparatus 100 of FIGS. 1 and 19 (hereinafter, the eye tracking apparatus 100) is mounted on the wearable device 1 of FIGS. 1 and 20 (hereinafter, the wearable device 1).

According to an embodiment, the wearable device 1 may be a glasses-type wearable device, for example, an augmented reality (AR) apparatus for providing an AR image or a virtual reality (VR) apparatus for providing a VR image. However, embodiments are not limited thereto.

Because the first eye tracker 101 and the second eye tracker 102 have the same structure and operate in the same manner, FIG. 1 will now be described with respect to the first eye tracker 101. That is, the following description provided with respect to the first eye tracker 101 applies to the second eye tracker 102.

The first eye tracker 101 according to an embodiment may include a light source module 301 of FIGS. 1 and 19 (hereinafter, the light source module 301) and a dynamic vision sensor (DVS) camera module 304 of FIGS. 1 and 19 (hereinafter, the DVS camera module 304). The second eye tracker 102 according to an embodiment may include the light source module 301 and the DVS camera module 304.

The light source module 301 according to an embodiment may provide light to a user's eye.

The light source module 301 may include a light source 302 of FIG. 19 (hereinafter, the light source 302) configured to provide light, and a scanning mirror 303 of FIG. 19 (hereinafter, the scanning mirror 303) configured to control the direction of the light provided by the light source 302.

The light source 302 according to an embodiment may include, for example, an infrared light-emitting diode (IR LED).

The scanning mirror 303 according to an embodiment may control the direction of the light (for example, IR light) provided by the light source 302 such that the light travels toward an eyeball region 330 including a cornea 310 of the user's eye.

The scanning mirror 303 may include a structure capable of mechanically changing a reflection angle such that the light provided by the light source 302 is reflected toward the user's eye, and may scan the eyeball region 330 including the cornea 310 by using the light provided by the light source 302.

According to an embodiment, as the light is provided to the eyeball region 330 including the cornea 310 of the user's eye under the control of the scanning mirror 303, light may be reflected from by the user's eye.

The light source module 301 and the DVS camera module 304 according to an embodiment may be arranged such that the light provided by the light source module 301 is projected toward the user's eye under the control of the scanning mirror 303 and the reflected light reflected by the user's eye travels toward the DVS camera module 304. According to an embodiment, various arrangement examples of the light source module 301 and the DVS camera module 304 mounted on the wearable device 1 will be described later with reference to FIGS. 18A through 18D.

The DVS camera module 304 according to an embodiment may include a camera module implemented as a DVS.

The DVS camera module 304 may generate image data when there is a change in the amount of light sensed by the DVS camera module 304 in units of pixels. The DVS camera module 304 generates image data according to a variation in light sensed and does not perform data processing when there is no variation in the sensed light.

A DVS image obtained by the DVS camera module 304 may include pixel data representing a change in light sensed according to a movement of a user's eye (e.g., movement of the user's pupil).

The DVS camera module 304 according to an embodiment may sense light reflected by the eyeball region 330 including the cornea 310 of the user's eye, and may generate the DVS image, based on the change in the amount of the light sensed by the DVS camera module 304.

According to an embodiment, the eye tracking apparatus 100 may track the view of the user's eye by detecting a cornea region and a pupil region from the generated DVS image.

The DVS camera module 304 may react to even a small amount of light, may be resilient or sensitive to an illumination change, and may process data with low power and at high speed. Accordingly, the eye tracking apparatus 100 according to an embodiment may perform real-time eye tracking by using the light source module 301 and the DVS camera module 304.

Figure 2:
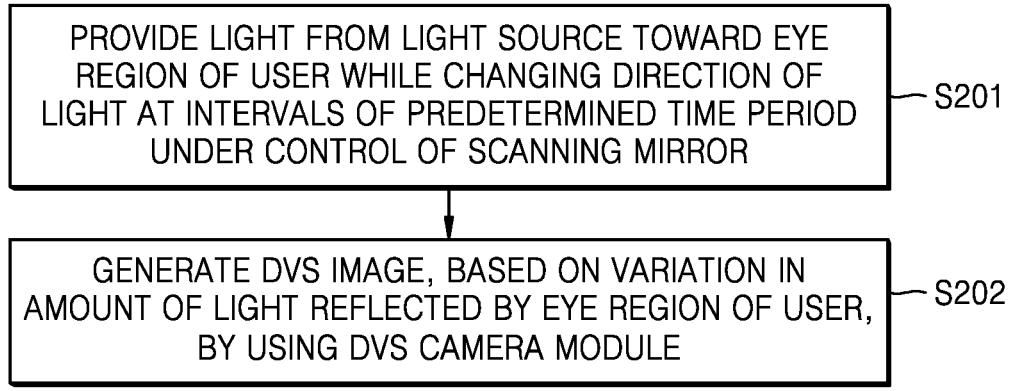
FIG. 2 is a flowchart of a method, performed by an eye tracking apparatus, of generating a dynamic vision sensor (DVS) image, according to an embodiment.
Figure 3A:
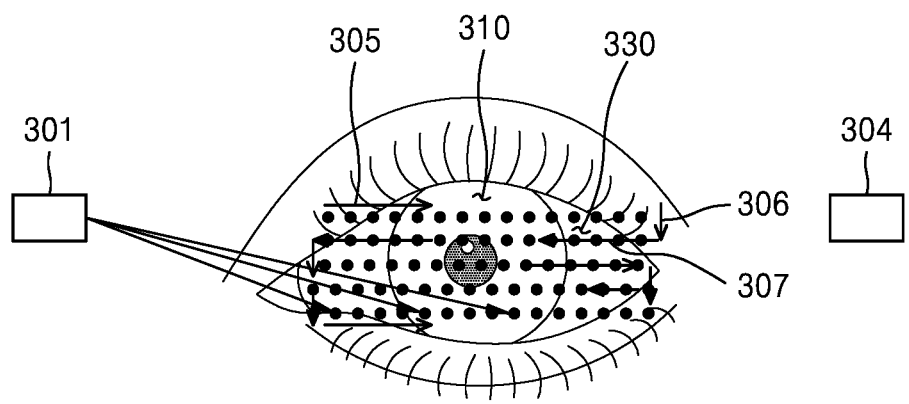
FIG. 3A is a view for explaining an example of changing a direction of light under control of a scanning mirror, according to an embodiment.
Figure 3B:
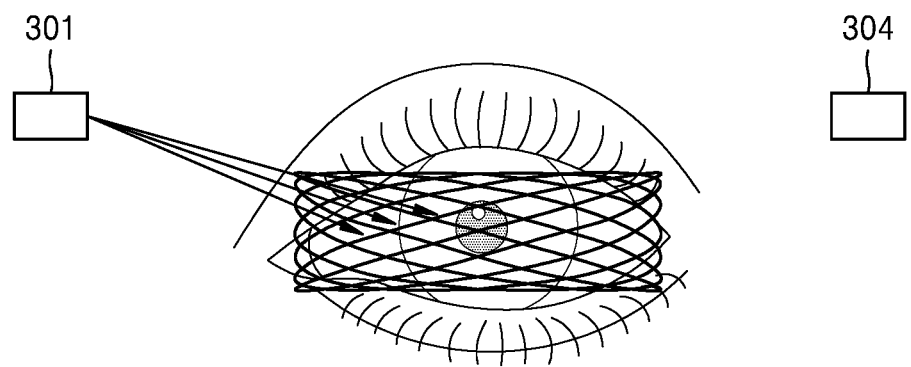
FIG. 3B is a view for explaining an example of changing a direction of light under control of a scanning mirror, according to an embodiment.
Figure 4:
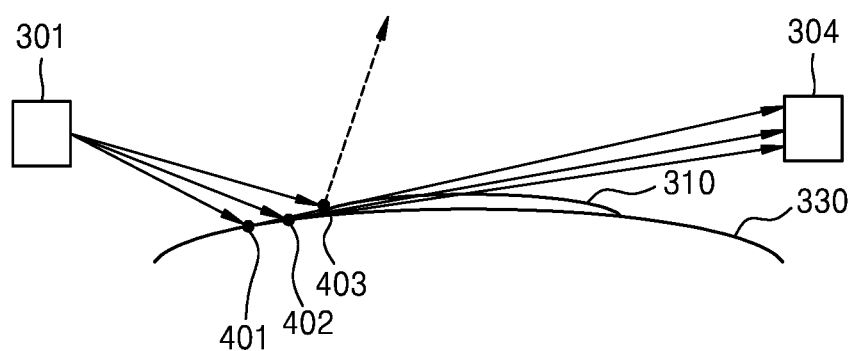
FIG. 4 is a view for explaining a difference in an amount of light reflected at a boundary point of an cornea of a user's eye, according to an embodiment.

FIG. 2 is a flowchart of a method, performed by the eye tracking apparatus 100, of generating the DVS image, according to an embodiment. FIG. 3A is a view for explaining an example of changing the direction of light under the control of a scanning mirror according to an embodiment. FIG. 3B is a view for explaining an example of changing the direction of light under the control of a scanning mirror according to an embodiment. FIG. 4 is a view for explaining a difference of the amount of light reflected at a boundary point of a cornea, according to an embodiment.

FIGS. 3A through 4 are views used to explain the method of FIG. 2.

Figure 19:
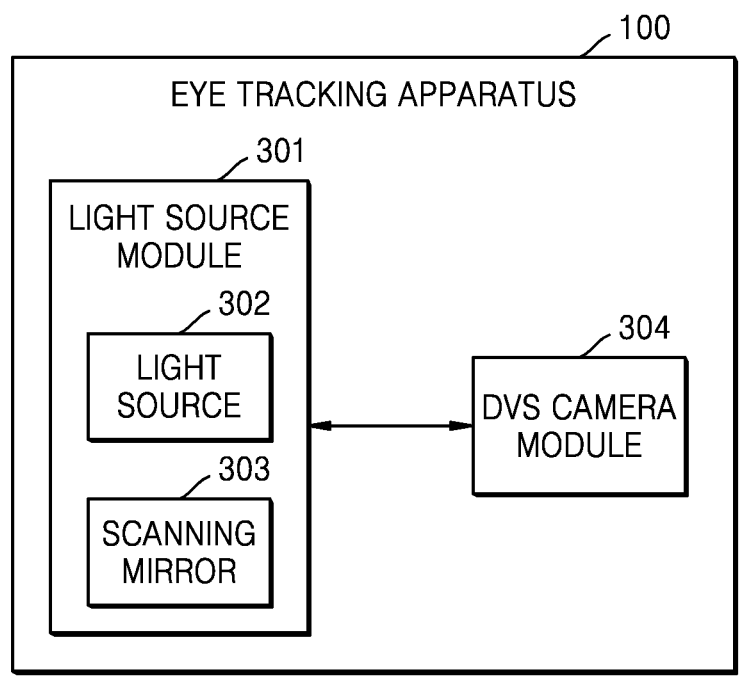
FIG. 19 is a block diagram of an eye tracking apparatus according to an embodiment.

In operation S201 of FIG. 2, the light source module 301 of FIG. 19 included in the eye tracking apparatus 100 may provide light from the light source 302 of FIG. 19 toward an eye region of a user while changing the direction of the light at intervals of a predetermined time period under the control of the scanning mirror 303 of FIG. 19.

According to an embodiment, the light source module 301 may include the light source 302 of FIG. 19 configured to provide light, and the scanning mirror 303 of FIG. 19 configured to control the direction of the light provided by the light source 302.

According to an embodiment, the light (for example, IR light) provided by the light source 302 of the light source module 301 may be projected toward the eyeball region 330 including the cornea region 310, while moving in a predetermined pattern (for example, moving along a longitudinal straight line or along a transverse straight line) at a predetermined speed (for example, 180°/ms) under the control of the scanning mirror 303.

According to an embodiment, the scanning mirror 303 may control to change a reflection angle of light such that the light provided by the light source 302 is reflected toward one point of the user's eye. Based on a predetermined light changing pattern, the scanning mirror 303 may control the light provided by the light source 302 to travel toward another point of the user's eye by changing the reflection angle of the light, so that the entire region of the user's eye may be scanned. According to an embodiment, the light source module 301 may closely scan the entire eyeball region 330 at very close intervals, under the control of the scanning mirror 303. The light source module 301 may project light toward the eyeball region 330 while changing the direction of the light in a predetermined light changing pattern for scanning the entire eyeball region 330. Here, the eyeball region 330 refers to a region of an eyeball that is exposed.

According to an embodiment, the pattern in which the direction of the light provided by the light source module 301 is changed may include at least one of a pattern in which the light moves along a longitudinal straight line or a pattern in which the light moves along a transverse straight line.

Referring to FIG. 3A, for example, the direction of the light provided by the light source module 301 may have a pattern in which, when the light is started to be projected from above a left upper side of the eyeball region 330, the direction in which light is projected changes rightwards along a transverse straight line 305, and then reaches a right upper side of the eyeball region 330, the projection of the light moves downwards along a column, as indicated by an arrow 306, and then moves leftwards along a transverse straight line 307. However, this is merely an example and the disclosure is not limited thereto.

For example, the pattern in which the direction of the light provided by the light source module 301 is changed may be a pattern in which light starts to be projected from above the left upper side of an eyeball region, the direction of projection of the light moves downwards in a longitudinal straight line, then moves rightwards along a row, and upwards in a longitudinal straight line.

Referring to FIG. 3B, the pattern in which the projection direction of the light provided by the light source module 301 is changed may include a Lissajous curve pattern.

While the projection direction of the light provided by the light source module 301 is being changed in the Lissajous curve pattern, the light may be projected toward the eye region of the user. Here, the term "eye region" may be interchangeably used with the term "eyeball region", which refers to a region of an eyeball that is exposed.

The pattern in which the projection direction of light is changed is not limited to the examples of FIGS. 3A and 3B, and may include any pattern that may be used to scan the entire eyeball region 330.

In operation S202 of FIG. 2, the first eye tracker 101 may generate the DVS image, based on a variation in the amount of light reflected by the eye region of the user, by using the DVS camera module 304.

According to an embodiment, the DVS image may be generated to determine whether there is a movement of the eye region of the user, based on whether there is a variation in the amount of light measured at one or more points of the eye region of the user for each of consecutive frames. The DVS image may include pixel data representing a change in the amount of light measured for each of the consecutive frames when there is the change.

Referring to FIG. 4, because the cornea 310 of the user protrudes from the eyeball region 330 according to the eye structure, when the amount of light reflected by a boundary point 403 of the protruding cornea 310 is compared with the amounts of light beams reflected by points 401 and 402 other than the cornea 310, there is a sharp difference therebetween due to a difference between the refractive indexes of incident light beams.

For example, the amount of light reflected by the boundary point 403 of the cornea 310 may be sharply reduced compared with the amounts of light beams reflected by the points 401 and 402 other than the cornea 310.

According to an embodiment, the DVS camera module 304 may sense a sharp difference between the amount of light reflected by the point 402 of the eyeball region 330 and the amount of light reflected by the boundary point 403 of the cornea 310, which is adjacent to the point 402, as a projection direction of the light provided by the light source module 301 changes over time, and may generate a DVS image representing a change in the light amount.

According to an embodiment, even when the user's eye actually does not move, the DVS camera module 304 scans the user's eye with the light provided by the light source module 301 while continuously changing the direction of the light over time, and thus may sense a difference between the amount of the reflected light at the boundary point of the cornea and the amount of the reflected light at a region outside the cornea. Accordingly, the DVS camera module 304 may generate a DVS image representing a change in the amount of light measured for each of consecutive frames, in units of pixels.

According to an embodiment, the wearable device 1 including the eye tracking apparatus 100 may track the view of the user's eye by detecting a cornea region from the DVS image.

A method of detecting a cornea region and a pupil region from a DVS image will now be described with reference to FIGS. 5 through 12.

Figure 5:
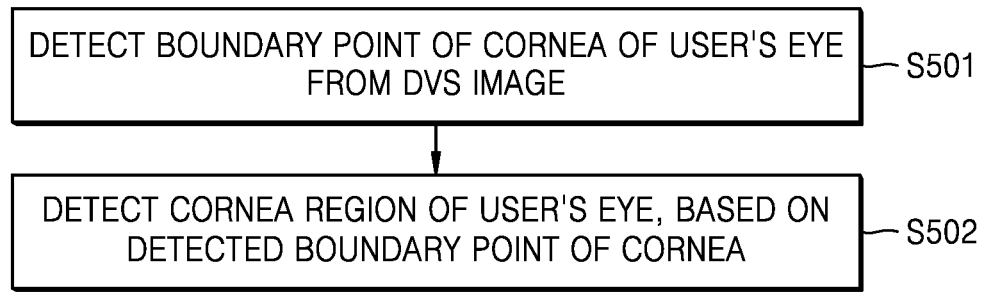
FIG. 5 is a flowchart of a method of detecting a boundary point of an cornea of a user's eye and an cornea region of the user's eye, according to an embodiment.
Figure 6:
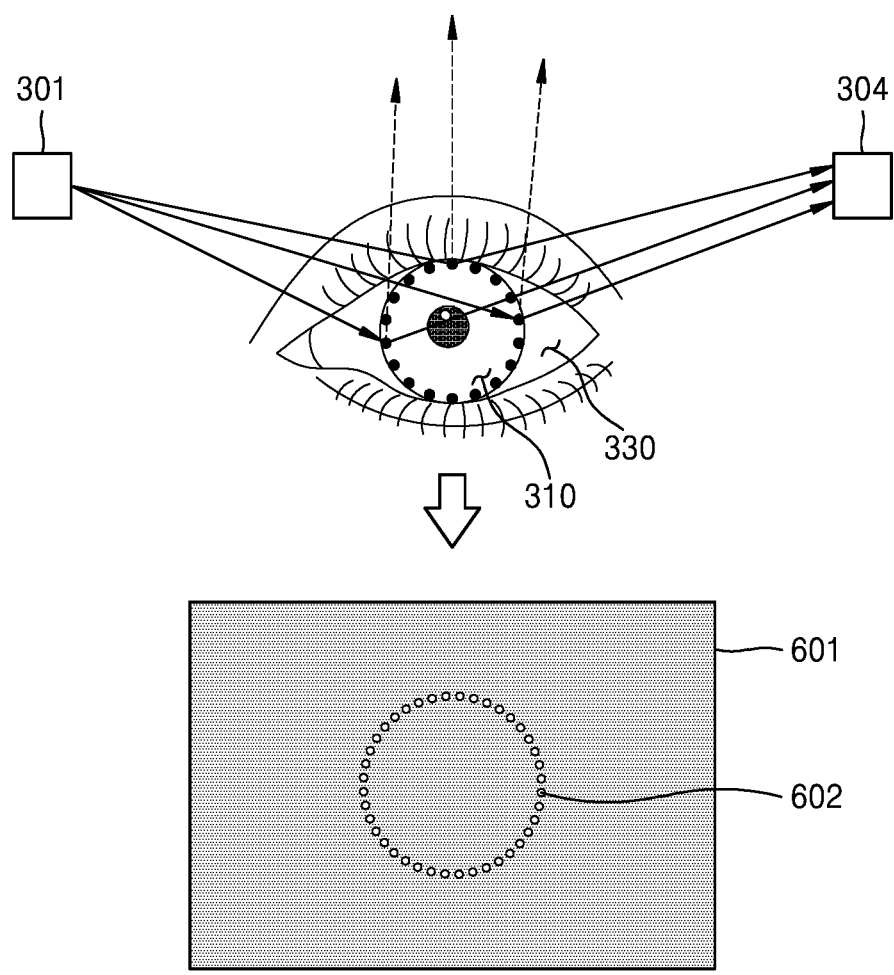
FIG. 6 is a view for explaining a principle in which a boundary point of an cornea and an cornea region are detected from a DVS image, according to an embodiment.

FIG. 5 is a flowchart of a method of detecting a boundary point of a cornea of a user's eye and a cornea region of the user's eye, according to an embodiment. FIG. 6 is a view for explaining a principle in which the boundary point of the cornea and the cornea region are detected from a DVS image, according to an embodiment. FIG. 6 is a view used to explain the method of FIG. 5.

According to an embodiment, the eye tracking apparatus 100 may provide a generated DVS image to a processor 120 of FIG. 20 (hereinafter, a processor 120) included in the wearable device 1 of FIG. 20.

In operation S501 of FIG. 5, the processor 120 may detect the boundary point of the cornea of the user's eye from the DVS image.

According to an embodiment, an operation of scanning the entire eyeball region 330 while changing the direction of the light provided by the light source module 301 in, for example, the pattern of FIG. 3A or 3B, may be performed. In this scanning operation, a substantial difference between the amount of reflected light when light is projected to one point outside the cornea 310 adjacent to the boundary point of the cornea and the amount of reflected light when light is projected to the boundary point of the cornea 310 may be detected. Accordingly, a DVS image 601 may be generated such that a boundary point 602 of the cornea, from which a substantial variation in the light amount is sensed, is distinguishable from a peripheral region.

According to an embodiment, even when there is no movement of the user's eye, the boundary point 602 of the cornea may be detected from the DVS image 601 due to a change in the amount of reflected light at the boundary point of the cornea 310.

In operation S502 of FIG. 5, the processor 120 may detect the cornea region of the user's eye, based on the detected boundary point of the cornea.

For example, referring to FIG. 6, the processor 120 may determine an internal region of the detected boundary point 602 of the cornea to be the cornea region.

According to an embodiment, as an operation of projecting light to the eye region while changing the direction of light over time under the control of the scanning mirror 303 is repeated, the processor 120 may track a change in the position of the detected cornea region.

Accordingly, the processor 120 may track a change in the view of the user's eye, based on the change in the position of the cornea.

Figure 7:
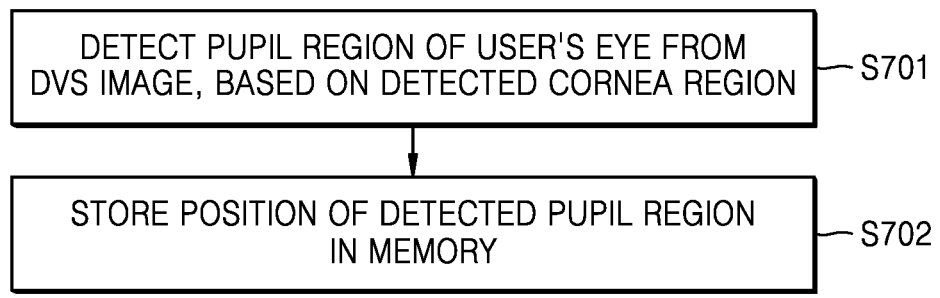
FIG. 7 is a flowchart of a method of detecting a pupil region of a user's eye, according to an embodiment.
Figure 8:
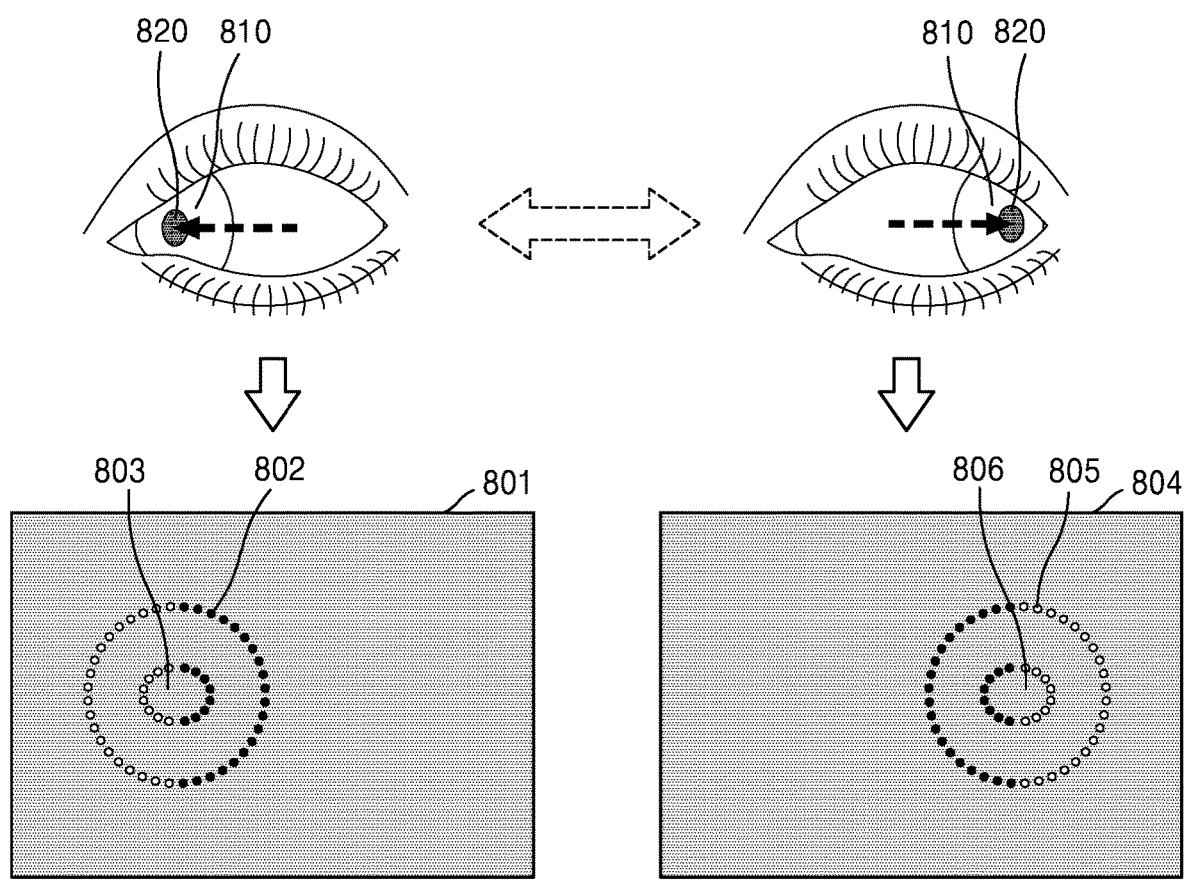
FIG. 8 is a view for explaining an example of detecting a pupil region, according to an embodiment.
Figure 9:
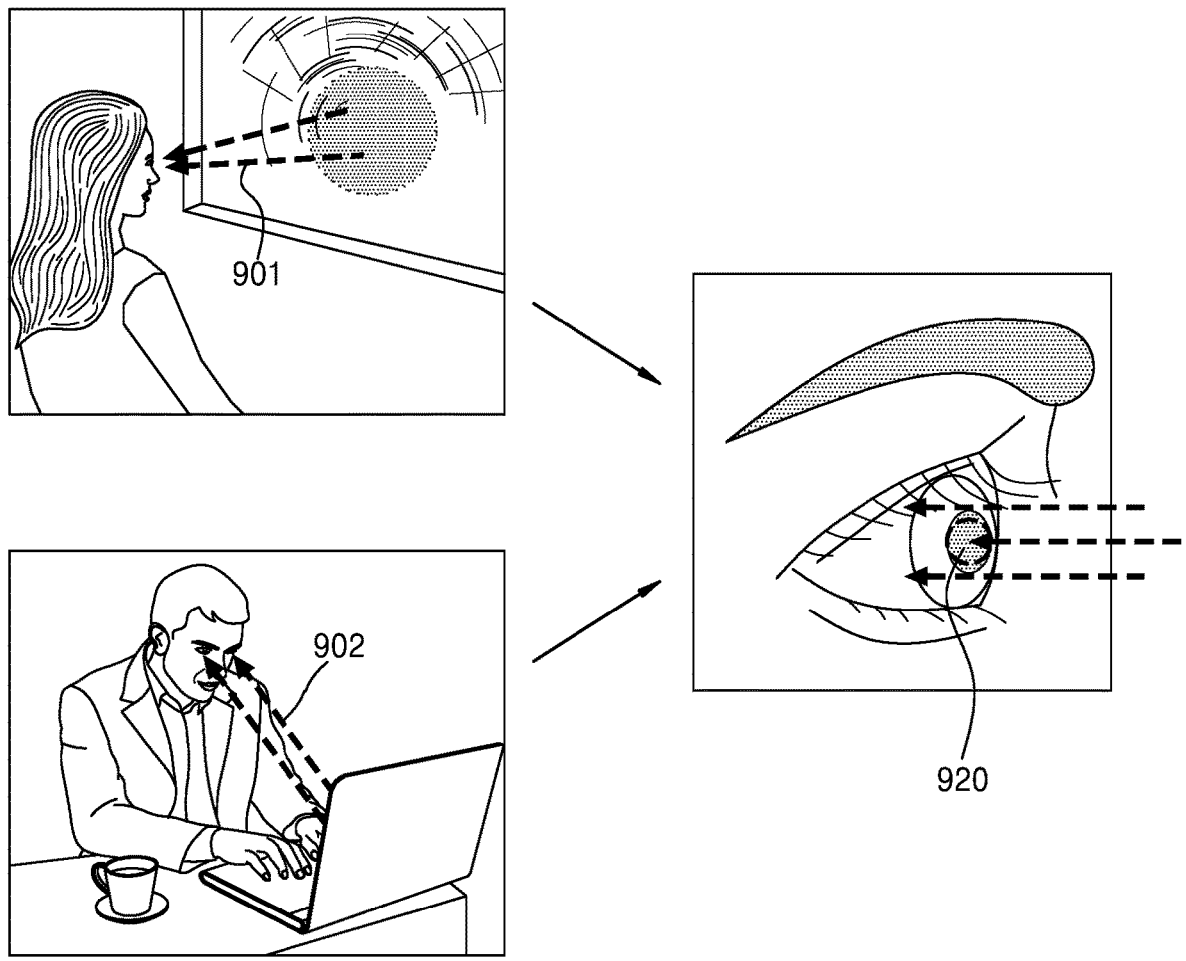
FIG. 9 is a view for explaining an example in which a pupil region is detected via natural light, according to an embodiment.

FIG. 7 is a flowchart of a method of detecting a pupil region of a user's eye, according to an embodiment. FIG. 8 is a view for explaining an example of detecting the pupil region, according to an embodiment. FIG. 9 is a view for explaining an example in which the pupil region is detected by natural light, according to an embodiment.

FIGS. 8 and 9 are schematic views used to explain the method of FIG. 7.

Figure 20:
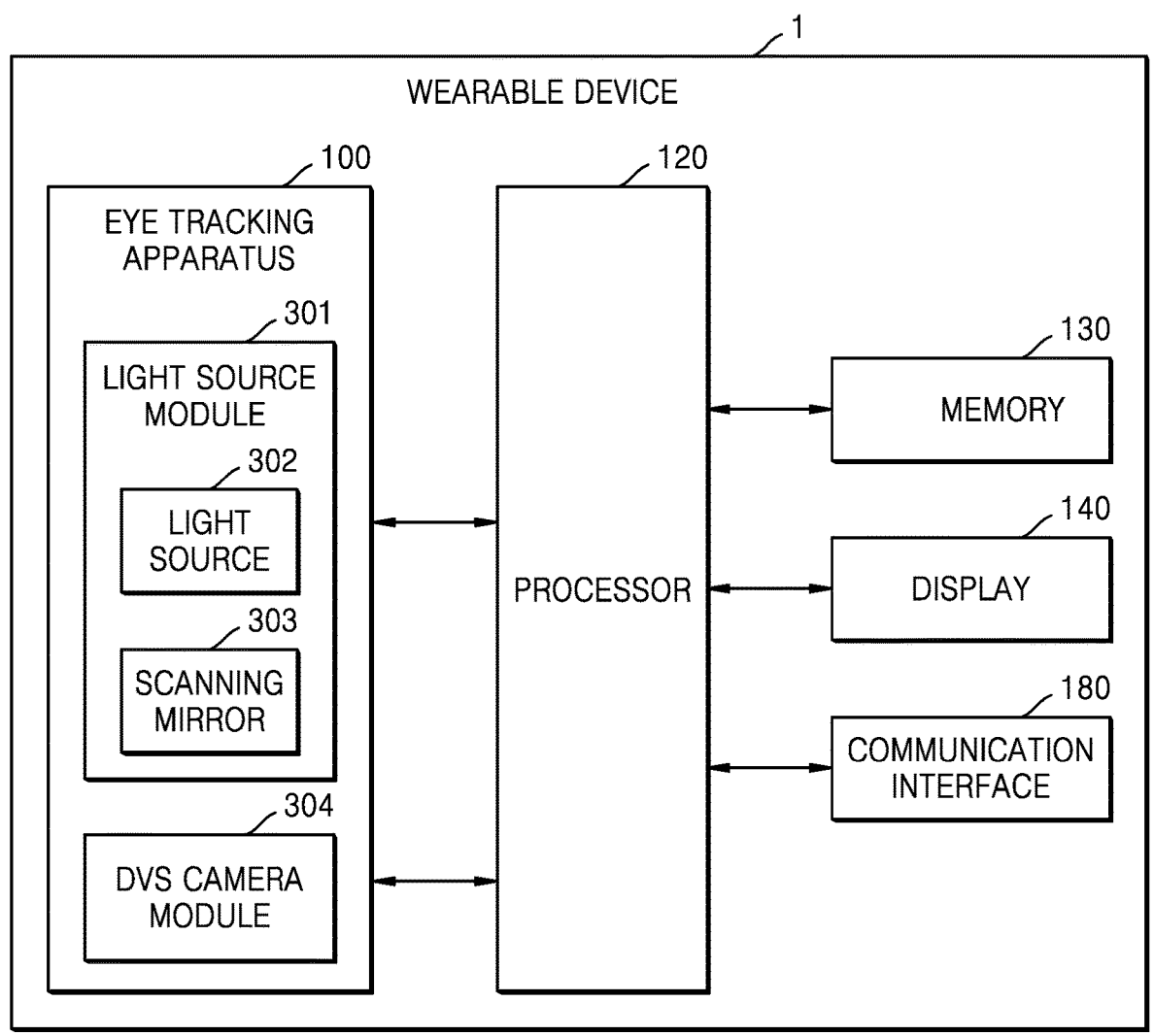
FIG. 20 is a block diagram of a wearable device including an eye tracking apparatus, according to an embodiment.

According to an embodiment, the eye tracking apparatus 100 may provide a generated DVS image to the processor 120 of the wearable device 1 of FIG. 20.

In operation S701 of FIG. 7, the processor 120 may detect the pupil region of the user's eye from the DVS image, based on the cornea region detected in operations S501 and S502 of FIG. 5.

Referring to FIG. 8, according to an embodiment, the processor 120 may detect, as pupil regions 803 and 806, regions distinguishable from peripheral regions from among the internal regions of cornea regions 802 and 805 detected from DVS images 801 and 804.

According to an embodiment, because a pupil region 820 within an eyeball region has a dark black color, when light is projected onto the pupil region 820, the pupil region 820 may absorb more light, compared with a peripheral region outside the pupil region 820. Accordingly, the amount of reflected light at the pupil region 820 is greatly different from the amount of reflected light when light is projected onto the peripheral region outside the pupil region 820. Accordingly, as a scan operation of the light source module 301 is repeated, the pupil regions 803 and 806 may be distinguishable from the peripheral regions, on the DVS images 801 and 804 generated by the DVS camera module 304.

Referring to FIG. 8, when a cornea 810 and the pupil region 820 of the user's eye move left and right, the DVS camera module 304 may consecutively generate a plurality of DVS images, as an operation of scanning the entire region of the user's eye is repeated. The consecutively-generated plurality of DVS images may represent movement of the user's eye according to changes in the positions of the cornea 810 and the pupil region 820 of the user's eye.

The DVS camera module 304 may measure a difference of the light amount for each pixel when a current frame is compared with a previous frame from among consecutively captured frames. The DVS camera module 304 may generate a (+) signal in a pixel in which a measured light amount is sensed to increase, e.g., from dark to bright, and thus may display a point having an increased light amount in, for example, a white color. The DVS camera module 304 may generate a (−) signal in a pixel in which a measured light amount is sensed to decrease, e.g., from bright to dark, and thus may display a point having a decreased light amount in, for example, a black color. Accordingly, a region of the DVS image where an object (e.g., a pupil or a cornea) newly appears according to a movement of the object may be displayed in white, and a region of the DVS image where the object (e.g., a pupil or a cornea) disappears according to the movement of the objection may be displayed in black.

According to an embodiment, a pixel region of the DVS image where the (+) signal or the (−) signal is not generated may be displayed in, for example, a gray color to be easily distinguishable from a black color or a white color. However, the colors in which pixel regions of the DVS image are displayed according to the (+) signal or the (−) signal are not limited to these examples.

For example, the pixel where the (+) signal is generated being displayed in white and the pixel where the (−) signal is generated being displayed in black is merely an example, and thus embodiments are not limited thereto. According to settings of the eye tracking apparatus 100, pixels of the DVS image may be displayed in different colors such that the pixel where the (+) signal is generated, the pixel where the (−) signal is generated, and the pixel where no (+) or (−) signal is generated may be displayed in various colors that are easily distinguishable from one another.

Referring to FIG. 8, for example, the DVS image 801, which is generated when the user's eye moves to left, may indicate that the cornea region 810 and the pupil region 820 of the user's eye move leftwards, by displaying, in white, pixels corresponding to respective left portions of the cornea region 802 and the pupil region 803 (that is, where the cornea region 802 and the pupil region 803 newly appear due to the movement of the eye and thus the (−) signal is generated) and displaying, in black, pixels of the DVS image 801 corresponding to respective right portions of the cornea region 802 and the pupil region 803 (that is, where the cornea region 802 and the pupil region 803 disappear due to the movement of the eye and thus the (+) signal is generated). In addition, the DVS image 804, which is generated when the user's eye moves to right, may indicate that the cornea region 810 and the pupil region 820 of the user's eye move rightwards, by displaying, in black, pixels corresponding to respective left portions of the cornea region 805 and the pupil region 806 (that is, where the cornea region 805 and the pupil region 806 disappear and thus the (+) signal is generated) and displaying, in white, pixels corresponding to respective right portions of the cornea region 805 and the pupil region 806 (that is, where the cornea region 805 and the pupil region 806 newly appear and thus the (−) signal is generated).

Referring to FIG. 9, because natural light (for example, sunlight 901 or display light 902) may be incident upon the front of the user's eye in a normal environment of the user, a difference in the light amount of reflected light due to natural light may be generated between a pupil region 920 having a dark black color within the eyeball region 330 and a peripheral region other than the pupil region 920 within the eyeball region 330.

Accordingly, as shown in FIG. 8, when the user's eye moves, namely, when the pupil region 820 moves, the DVS camera module 304 may sense a movement of the pupil region 820 having a dark black color, and the DVS images 801 and 804 may be generated such that the pupil regions 803 and 806 are distinguishable from other regions.

In operation S702 of FIG. 7, the processor 120 may store a position of the detected pupil region in a memory 130 of FIG. 20.

According to an embodiment, as the position of the detected pupil region changes, the processor 120 may update a changed position and store the changed position in the memory 130 of FIG. 20. Accordingly, the processor 120 may determine a position of the pupil of the user that is a position at the most recent time point from a current time point.

According to an embodiment, while an operation of providing light to the eye region while changing the direction of the light under the control of the scanning mirror 303 is performed, the processor 120 may track a change in the position of the pupil by updating a changed position of the detected pupil region and storing the changed position in the memory 130 of FIG. 20.

Accordingly, the processor 120 of the wearable device 1 may track a change in the view of the user's eye, based on the change in the position of the pupil.

Figure 10:
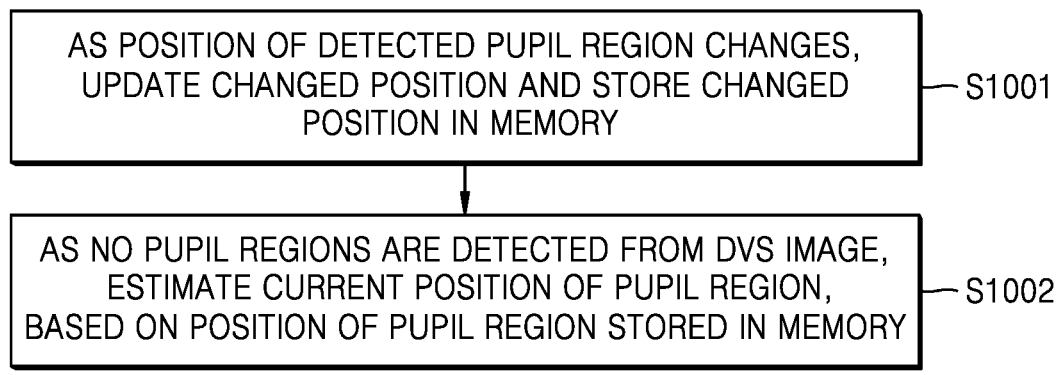
FIG. 10 is a flowchart of a method of estimating a pupil region, according to an embodiment.
Figure 11:
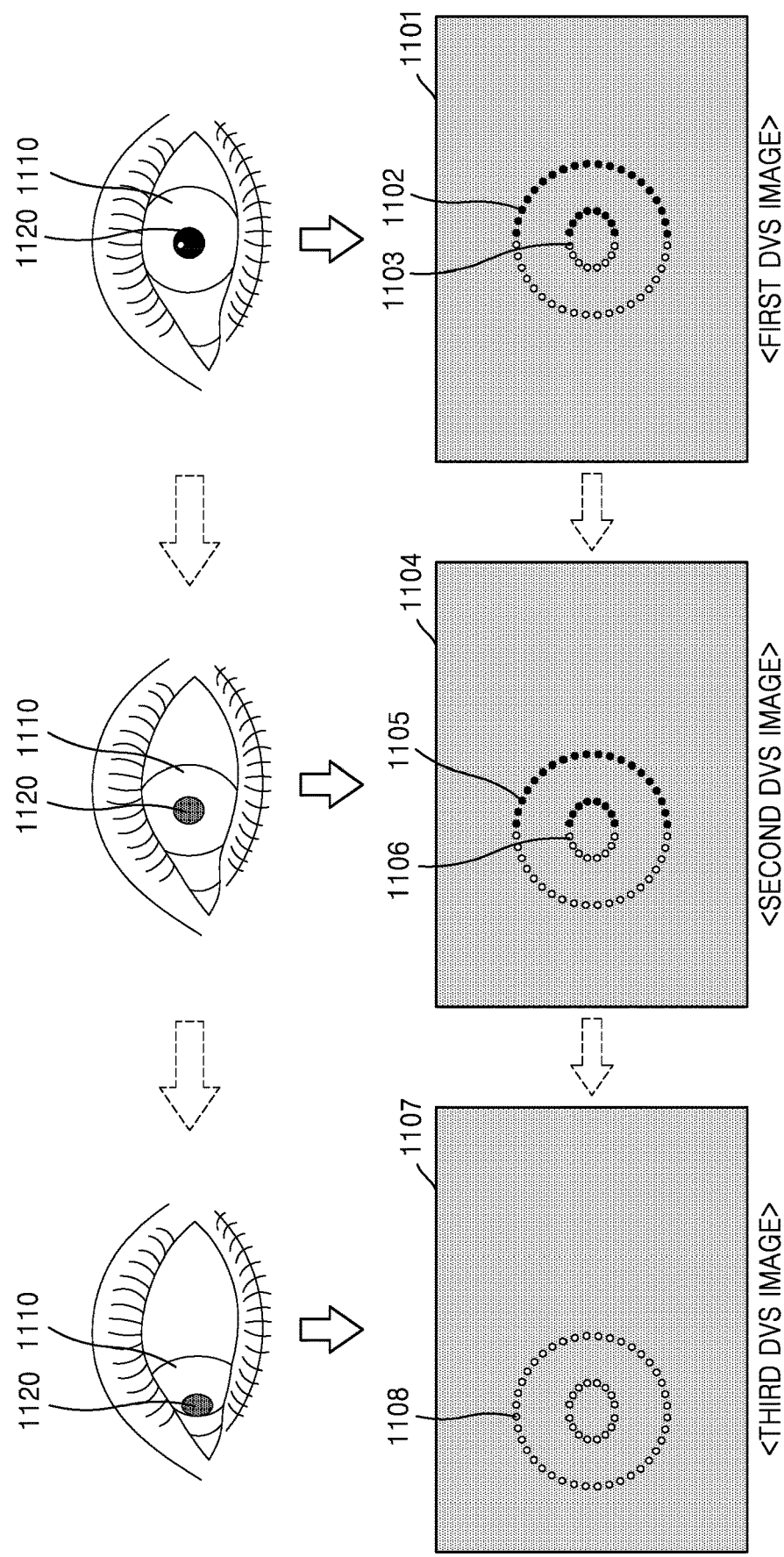
FIG. 11 is a view for explaining an example in which no pupil region is detected from a DVS image, according to an embodiment.
Figure 12:
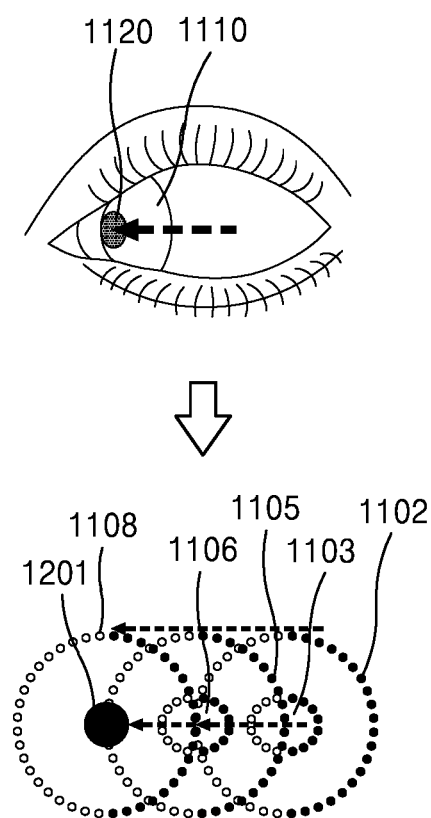
FIG. 12 is a view for explaining a principle in which a pupil region is estimated from a stored DVS image, according to an embodiment.

FIG. 10 is a flowchart of a method of estimating a pupil region, according to an embodiment. FIG. 11 is a view for explaining an example in which no pupil regions are detected from a DVS image, according to an embodiment. FIG. 12 is a view for explaining a principle in which a pupil region is estimated from a stored DVS image, according to an embodiment.

FIGS. 11 and 12 are schematic views used to explain the method of FIG. 10.

According to an embodiment, the eye tracking apparatus 100 may provide a generated DVS image to the processor 120.

In operation S1001 of FIG. 10, as the position of the detected pupil region changes, the processor 120 may update the changed position of the pupil region and store the changed position in the memory 130 of FIG. 20.

According to an embodiment, as the position of the detected pupil region is changed during a repetitive scan operation of the light source module 301 on the eyeball region, the processor 120 may update a changed position of the pupil region and store the changed position in the memory 130 of FIG. 20.

Accordingly, the processor 120 may track a change in the position of the pupil.

In operation S1002 of FIG. 10, as no pupil regions are detected from the DVS image, the processor 120 may estimate a current position of the pupil region, based on the position of the pupil region stored in the memory 130 of FIG. 20.

According to an embodiment, when no pupil regions are detected from the DVS image, the processor 120 may determine the current position of the pupil region, based on a position of the pupil region that has been updated and stored most recently from a current time point.

Referring to FIG. 11, for example, when the user's eye moves leftwards, a first DVS image 1101 and a second DVS image 1104 may be displayed such that a first cornea region 1102 is distinguishable from a first pupil region 1103 and a second cornea region 1105 is distinguishable from a second pupil region 1106. However, when the movement of the user's eye stops, a third cornea region 1108 may be displayed on a third DVS image 1107, but no third pupil region may be displayed, which will be described in detail below.

The DVS camera module 304 may generate image data, based on a change in sensed light. When the user's eye moves, the eye tracking apparatus 100 may generate a DVS image due to a change in the amount of light measured at each point on the eye region.

When the user's eye does not move, a difference in reflected light may be generated at the boundary point of the cornea due to the light provided by the light source module 301 while the direction of the light is being changed, and thus the boundary point of the cornea may be distinguishable on the DVS image. Because a pupil region having a dark black color absorbs a large amount of light provided by the light source module 301, compared with the peripheral region outside the pupil region, a difference in reflected light is generated, and thus the pupil region may be displayed distinguishably on the DVS image.

However, when the user wears the wearable device 1 of FIG. 1 including the eye tracking apparatus 100, light from the light source module 301 may be incident upon the user's eye from a direction that is lateral to the user's eye. Thus, in this usage environment, a change in the amount of reflected light may be generated at the boundary point of the protruding cornea, but a change in the amount of reflected light may not be generated or only a little change may be generated on a pupil region that does not protrude as the cornea region. According to an embodiment, the DVS camera module 304 may not generate a (+) or (−) signal according to a change in the light amount at a point where a measured change in the light amount is less than a predetermined threshold. Accordingly, the DVS image may not include any indication at the point where the measured change in the light amount is less than the predetermined threshold.

For example, sensitivity of a light amount change for generating the (+) or (−) signal in the DVS camera module 304 is set to be high, namely, a threshold of a light amount change for generating the (+) or (−) signal is set to be low, the pupil region may be distinguishably displayed in the DVS image. However, when the sensitivity of the light amount change for generating the (+) or (−) signal in the DVS camera module 304 is set to be low, namely, the threshold of a light amount change for generating the (+) or (−) signal is set to be high, the pupil region may not be displayed in the DVS image.

For example, because the DVS camera module 304 generates the (+) or (−) signal according to a change in the light amount, the pupil region may not be sufficiently distinguishable on the DVS image or not shown on the DVS image.

According to an embodiment, when the pupil region is not shown on the DVS image or is shown vaguely with a definition less than a predetermined standard, the processor 120 may determine that no pupil region is detected.

According to an embodiment, when the processor 120 determines that no pupil region is detected or the pupil region is not clearly distinguished from the DVS image, the processor 120 may estimate the current position of the pupil region, based on a position of the pupil region that is stored at a time point closest to a current time.

Referring to FIGS. 11 and 12, when the positions of the first and second pupil regions 1103 and 1106 on first and second DVS images consecutively produced while the user's eye moved leftwards are stored in a memory, the position of a third pupil region 1201 on the third DVS image 1107 may be estimated based on the positions of the first and second pupil regions 1103 and 1106 and the positions of the first, second, and third cornea regions 1102, 1105, and 1108.

According to an embodiment, even when only the cornea region is shown on the DVS image and the position of the pupil region is not shown or is shown unclearly on the DVS image, the processor 120 may estimate the current position of the pupil region by using the position of the pupil region stored in the memory 130 of FIG. 20.

Accordingly, the processor 120 may track a change in the view of the user's eye by tracking the positions of the cornea and the pupil of the user's eye.

Figure 13:
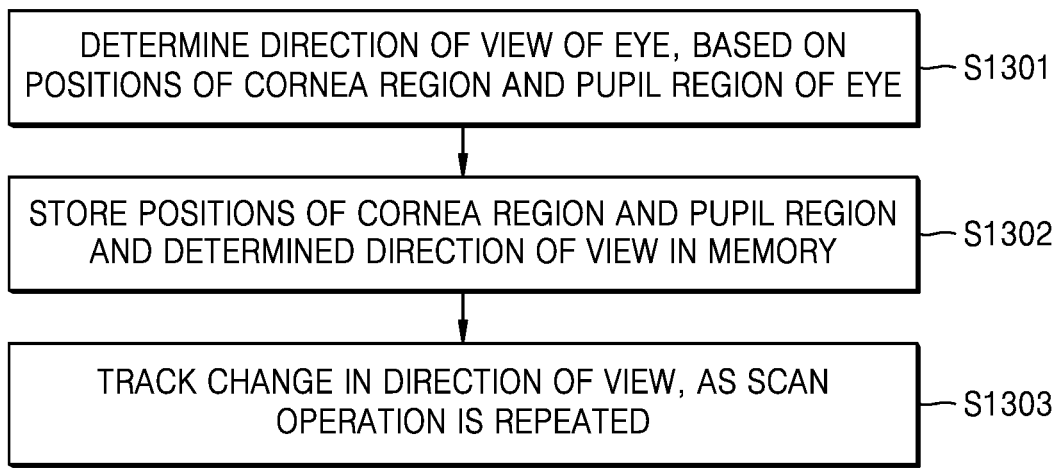
FIG. 13 is a flowchart of a method of tracking a direction of view of an eye, according to an embodiment.
Figure 14:
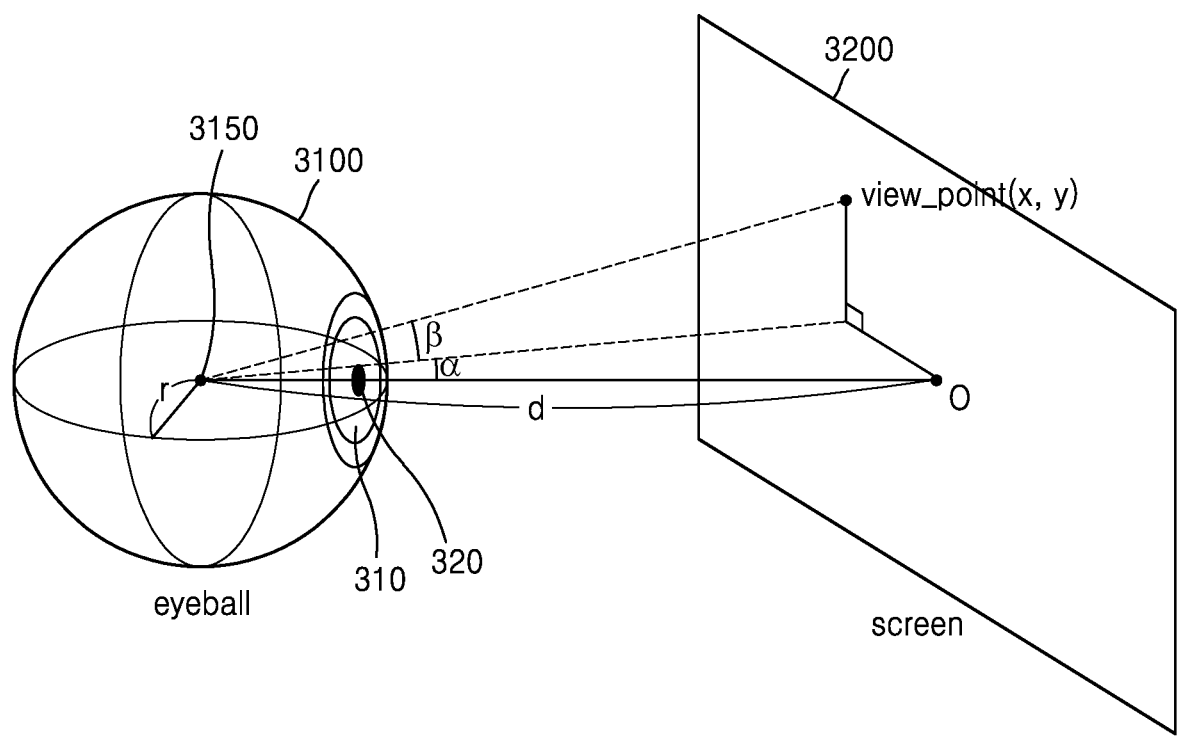
FIG. 14 is a view for explaining a direction of view of a user's eye, according to an embodiment.
Figure 15A:
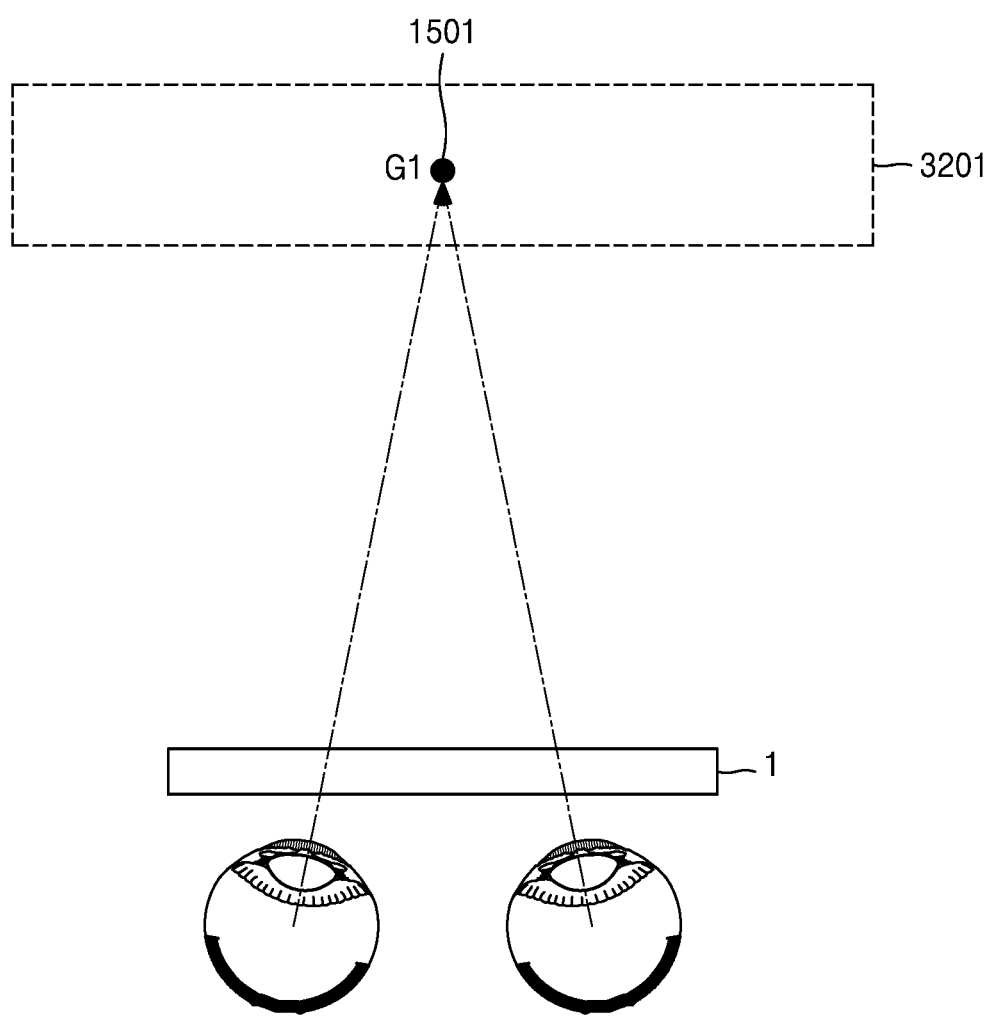
FIG. 15A is a view for explaining an example of a direction of view of a user's eye, according to an embodiment.
Figure 15B:
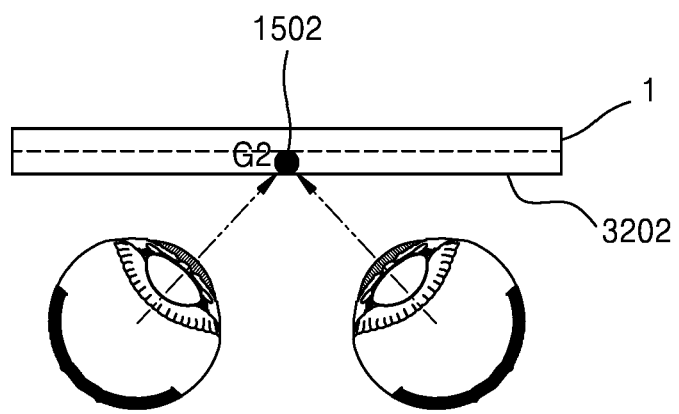
FIG. 15B is a view for explaining an example of a direction of view of a user's eye, according to an embodiment.

FIG. 13 is a flowchart of a method of tracking a direction of a view of an eye, according to an embodiment. FIG. 14 is a view for explaining a direction of a view of a user's eye, according to an embodiment. FIGS. 15A and 15B are views for explaining an example of the direction of a view of the user's eye, according to an embodiment.

FIGS. 14 through 15B are views used to explain the method of FIG. 13.

According to an embodiment, the eye tracking apparatus 100 may provide a generated DVS image to the processor 120.

According to an embodiment, the processor 120 may determine a direction of a view of an eye, based on the positions of a cornea region and a pupil region of the eye. As a scan operation of the DVS camera module 304 is repeated, the processor 120 may track a change in the direction of view of the eye.

In operation S1301 of FIG. 13, the processor 120 may determine the direction of the view of the eye, based on the positions of a cornea region and a pupil region of the eye.

According to an embodiment, the direction of the view may refer to a direction that is viewed by the user's eye.

According to an embodiment, eye tracking may be performed by tracking the change in the direction of the view according to a movement of the user's eye.

FIG. 14 is a view for explaining a direction of a view of a user's eye, according to an embodiment. FIG. 14 illustrates a three-dimensional (3D) eyeball model of a user.

The processor 120 may determine the direction of a view of a user's left eye by using the first eye tracker 101 of FIG. 1, and may determine the direction of the view of the user's right eye by using the second eye tracker 102 of FIG. 1.

For example, the processor 120 may determine the direction of the view, based on an average eyeball model of a person. The eyeball model may be modeled by assuming that an eyeball 3100 of a human has a spherical shape and the eyeball 3100 ideally rotates according to the direction of the view.

In FIG. 14, d denotes a distance between a center 3150 of a user's eye and a virtual screen 3200, and a case where the user's eye gazes at a point O of the virtual screen 3200 is illustrated. In FIG. 14, when the user's eye that gazes at the point O changes the view to gaze at a view point (x, y) on the virtual screen 3200, a denotes an angle of rotation of the user's eye in the x-axis direction in accordance with the change of the view, and β denotes an angle of rotation of the user's eye in the y-axis direction in accordance with the change of the view. In FIG. 14, r denotes the radius of a sphere assuming that the user's eye has a shape of the sphere.

According to an embodiment, the processor 120 may calculate the direction of the view, based on the positions of the cornea 310 and the pupil 320 detected from the DVS image obtained from the eye tracking apparatus 100.

According to an embodiment, the direction of the view may refer to a direction that is viewed by the user's eye. The direction of the view may be determined based on the center 3150 of the user's eye and the positions of the cornea 310 and the pupil 320. The processor 120 according to an embodiment may calculate a changed direction of the view, based on positions of the cornea and the pupil changed from a plurality of DVS images obtained consecutively.

The processor 120 may calculate degrees of rotation (e.g., α and β) of the user's eye (e.g., the left eye) from the consecutively-obtained plurality of DVS images, and the processor 120 may use the degrees of rotation α and β of the user's eye to calculate a two-dimensional (2D) coordinate value (x, y) to which the direction of the view of the user's eye on the virtual screen 3200 has been changed.

For example, the 2D coordinate value (x, y) may be expressed as shown in Equation 1 below.

$$x = d \cdot \tan \alpha,$$

$$y = d \cdot \sec \alpha \cdot \tan \beta,$$ [Equation 1]

Referring to FIG. 15A, for example, a gaze point G1, 1501 where directions of views of the user's both eyes are met may exist on a virtual screen 3201 on an actual space viewed by a user of the wearable device 1.

Referring to FIG. 15B, for example, a gaze point G2, 1502 where the directions of views of the user's both eyes are met may exist on a screen 3202 on a display viewed by the user of the wearable device 1.

According to an embodiment, the processor 120 may estimate a coordinate value of a gaze point by using binocular disparity of both eyes, the direction of the view of the left eye, and the direction of the view of the right eye.

In operation S1302 of FIG. 13, the processor 120 may store the positions of the cornea region and the pupil region and the determined direction of the view in the memory 130 of FIG. 20.

According to an embodiment, the processor 120 may store the positions of the cornea region and the pupil region detected using the method of FIGS. 1 through 12 in the memory 130 of FIG. 20. The processor 120 may store the direction of the view determined based on the positions of the cornea region and the pupil region, in the memory 130 of FIG. 20.

In operation S1303 of FIG. 13, the processor 120 may track a change in the direction of the view, as a scan operation of the DVS camera module 304 is repeated.

According to an embodiment, the eye tracking apparatus 100 may repeat a scan operation of the DVS camera module 304. According to an embodiment, the scan operation may refer to an operation of providing light from the light source 302 toward an eye region while changing the direction of the light under the control of the scanning mirror 303.

The eye tracking apparatus 100 may provide, to the processor 120, a plurality of DVS images consecutively produced by the DVS camera module 304 as a scan operation is repeated. The processor 120 may determine the positions of the cornea region and the pupil region from each of the plurality of DVS images, and may determine the direction of the eye's view.

The processor 120 may store the cornea region and the pupil region and the determined direction of the eye's view, in the memory 130 of FIG. 20. The processor 120 may track a change in the direction of the view, based on changes in the positions of the cornea region and the pupil region that are sequentially stored.

Figure 16:
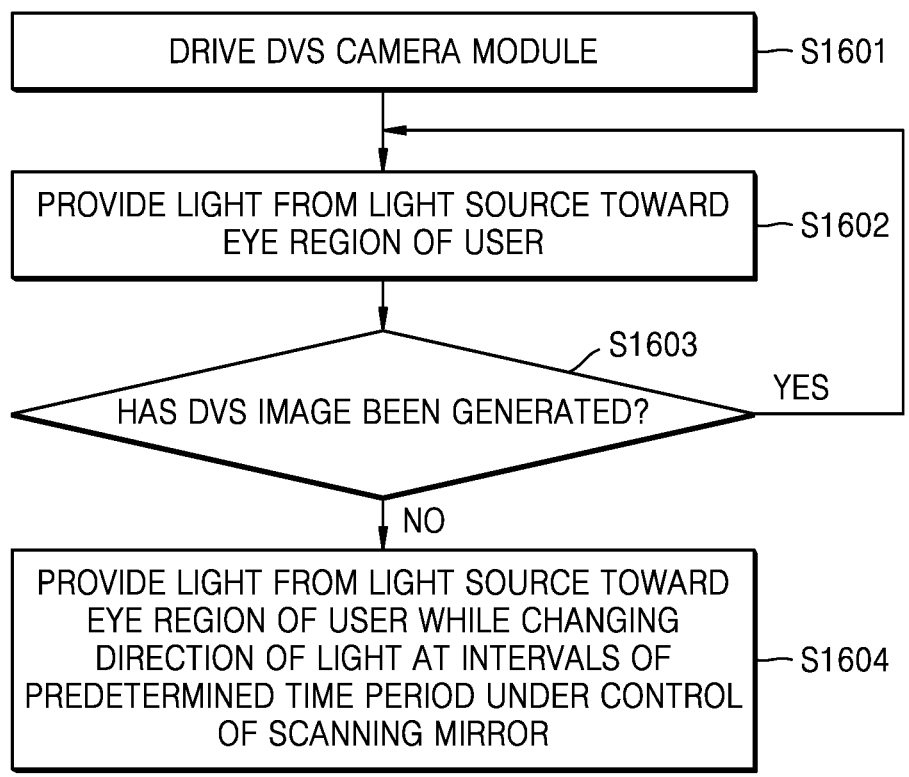
FIG. 16 is a flowchart of an operation method of an eye tracking apparatus, according to an embodiment.

FIG. 16 is a flowchart of an operation method of the eye tracking apparatus 100, according to an embodiment.

In operation S1601 of FIG. 16, the eye tracking apparatus 100 may drive the DVS camera module 304.

The DVS camera module 304 according to an embodiment may sense light reflected by an eye region of a user, and may generate a DVS image, based on a change in the amount of sensed light.

In operation S1602 of FIG. 16, the eye tracking apparatus 100 may provide light from the light source 302 toward the eye region of the user.

The scanning mirror 303 included in the light source module 301 of FIG. 1 according to an embodiment may control the direction of the light (for example, IR light) provided by the light source 302 such that the light travels toward the eye region. As the light is provided to the eye region under the control of the scanning mirror 303, light reflected from the user's eye is detected.

According to an embodiment, the light source module 301 of FIG. 1 may provide light toward one point on the eye region, without changing the direction of the light over time, under the control of the scanning mirror 303.

In operation S1603 of FIG. 16, the eye tracking apparatus 100 may determine whether a DVS image has been generated.

According to an embodiment, as the user's eye moves, the DVS camera module 304 may generate the DVS image, based on a difference of the amounts of light beams sensed on the boundary point of the cornea of the user's eye and a difference of the amounts of light beams sensed on the pupil region.

When it is determined that a DVS image has been generated, the eye tracking apparatus 100 may provide light toward the eye region, without changing the direction of the light over time (operation S1602). Based on the DVS image, tracking of an eye may be performed.

According to an embodiment, when there is a movement of the user's eye, the DVS camera module 304 generates the DVS image without an operation in which the scanning mirror 303 controls the direction of light to be changed at intervals of a predetermined time period, and thus direction-change control of the scanning mirror 303 may not be driven.

Accordingly, the eye tracking apparatus 100 may be driven with low power, and power consumption thereof may be minimized.

According to an embodiment, when there is no movement of the user's eye, the DVS camera module 304 is unable to sense a change in the light amount due to a movement, and thus may generate no DVS images.

In operation S1604 of FIG. 16, based on a determination that no DVS images are generated, the eye tracking apparatus 100 may provide the light provided by the light source 302 toward the eye region of the user while changing the direction of the light at intervals of a predetermined time period under the control of the scanning mirror 303.

According to an embodiment, when it is determined that no DVS images are generated, the eye tracking apparatus 100 may drive the scanning mirror 303 so that the direction of the light is changed at intervals of the predetermined time period.

According to an embodiment, even when there is no movement of the user's eye, the DVS camera module 304 may sense a sharp variation in the amount of reflected light reflected by the boundary point of the cornea, as a projection direction of the light provided by the light source module 301 changes over time, and may generate a DVS image representing the change in the light amount.

Figure 17:
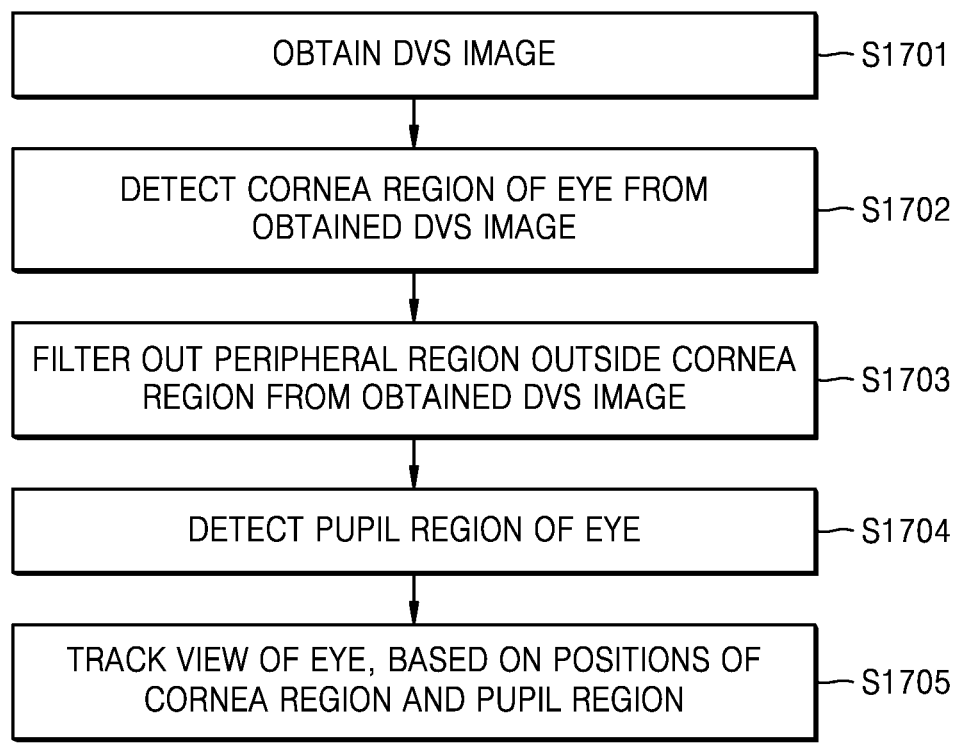
FIG. 17 is a flowchart of an operation method, of a wearable device, of performing eye tracking, according to an embodiment.

FIG. 17 is a flowchart of an operation method of the wearable device 1, according to an embodiment.

In operation S1701 of FIG. 17, the processor 120 of the wearable device 1 may obtain a DVS image.

According to an embodiment, the eye tracking apparatus 100 may generate a DVS image. The generation of the DVS image by the eye tracking apparatus 100, according to an embodiment, may be performed based on description with reference to FIGS. 2 through 4.

The eye tracking apparatus 100 may provide the generated DVS image to the processor 120.

In operation S1702 of FIG. 17, the processor 120 of the wearable device 1 may detect a cornea region of an eye from the obtained DVS image. The detection of the cornea region of the eye from the DVS image by the processor 120 according to an embodiment may be performed based on description with reference to FIGS. 5 and 6.

According to an embodiment, the processor 120 may filter out a DVS image from which the cornea region has not been detected, from the obtained DVS image. For example, a DVS image obtained when user's eyes are closed may be filtered out.

In operation S1703 of FIG. 17, the processor 120 of the wearable device 1 may filter out a peripheral region outside the cornea region from the obtained DVS image.

According to an embodiment, the DVS image generated by the DVS camera module 304 may include not only the cornea region of the eye but also a region other than an eyeball, such as an eyelid region or an eyelash region. Because the processor 120 may track the view of the eye, based on the position of the cornea region, the peripheral region outside the cornea region may be unnecessary for eye tracking. Accordingly, after detecting the cornea region from the DVS image generated by the DVS camera module 304, the processor 120 may filter out the peripheral region outside the cornea region.

According to an embodiment, there may exist a case where the detected cornea region includes only a partial region of the cornea, for example, a case where a portion of the cornea is hidden by an eyelid or an eyelash of the eye and thus the entire region of the cornea is not detected. In this case, after filtering out the peripheral region outside the cornea region, such as the eyelid region or the eyelash region, from the DVS image, the processor 120 may estimate a remaining not-shown partial region of the cornea region, based on a shown partial region of the cornea region.

According to an embodiment, the processor 120 may quickly and accurately detect a pupil region within the cornea region, based on the position of the cornea region, by filtering out the peripheral region outside the cornea region.

In operation S1704 of FIG. 17, the processor 120 of the wearable device 1 may detect a pupil region of the eye. The detection of the pupil region of the eye from the DVS image by the processor 120 according to an embodiment may be performed based on description with reference to FIGS. 7 through 12.

In operation S1705 of FIG. 17, the processor 120 of the wearable device 1 may track the view of the eye, based on the positions of the cornea region and the pupil region. The tracking of the view of the eye by the processor 120 according to an embodiment may be performed based on description with reference to FIGS. 13 through 15B.

FIGS. 18A through 18D are views for explaining various arrangement examples of a light source module and a DVS camera module, according to an embodiment. According to an embodiment, the first eye tracker 101 of FIG. 1 for tracking the view of a user's left eye and the second eye tracker 102 of FIG. 1 for tracking the view of a user's right eye may be mounted on the glasses-type wearable device 1 of FIG. 1.

Each of the first eye tracker 101 and the second eye tracker 102 according to an embodiment may include the light source module 301 of FIG. 1 and the DVS camera module 304 of FIG. 1.

Because the first eye tracker 101 and the second eye tracker 102 have the same structure and operate in the same manner, FIGS. 18A through 18D will now be described based on the first eye tracker 101 as a representative example.

According to an embodiment, the light provided by the light source module 301 of FIG. 1 may be projected toward the user's eye, and reflected light reflected by the user's eye may be incident upon the DVS camera 304 of FIG. 1.

Accordingly, in order for the light provided by the light source module 301 mounted on the glasses-type wearable device 1 of FIG. 1 to be projected toward the user's eye and for the reflected light reflected by the user's eye to travel toward the DVS camera module 304, the light source module 301 and the DVS camera module 304 may be arranged to be a certain distance spaced apart from each other with the user's eye therebetween when the user has worn the glasses-type wearable device 1 of FIG. 1.

According to an embodiment, the light source module 301 and the DVS camera module 304 may be built in a frame region of the glasses-type wearable device 1 of FIG. 1.

FIGS. 18A through 18D illustrate a frame of the glasses-type wearable device 1 on which the first eye tracker 101 of FIG. 1 for tracking the view of the left eye has been mounted.

Figure 18A:
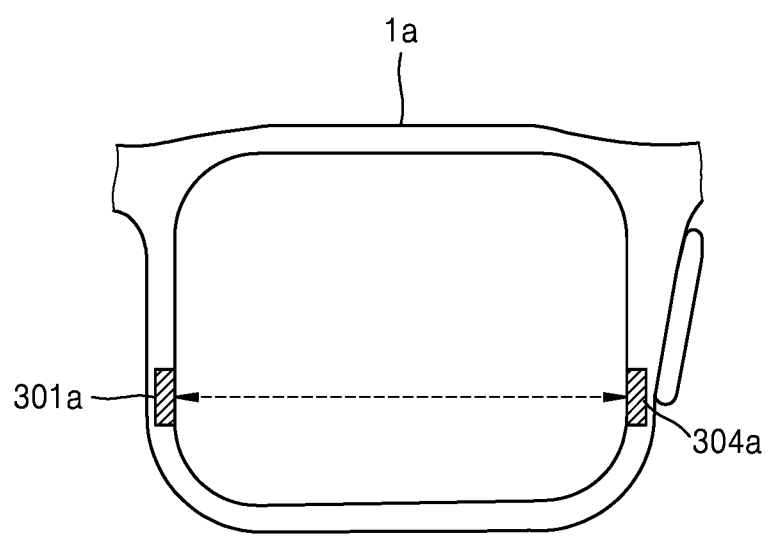
FIG. 18A is a view for explaining an arrangement example of a light source module and a DVS camera module, according to an embodiment.

As shown in FIG. 18A, a first light source module 301a may be arranged on a left lower portion of a frame 1a, and a first DVS camera module 304a may be arranged on a right lower portion of the frame 1a.

According to an embodiment, as the first light source module 301a is arranged on a lower portion of the frame 1a, interference by the eyelash when light is projected from the first light source module 301a toward the eyeball region of the user may be minimized.

According to an embodiment, as the first DVS camera module 304a is built on the lower portion (for example, a nose support portion) of the frame 1a, a space may be secured, and thus an influence of the eye tracking apparatus upon the outer appearance of the glasses-type wearable device 1 may be minimized.

Figure 18B:
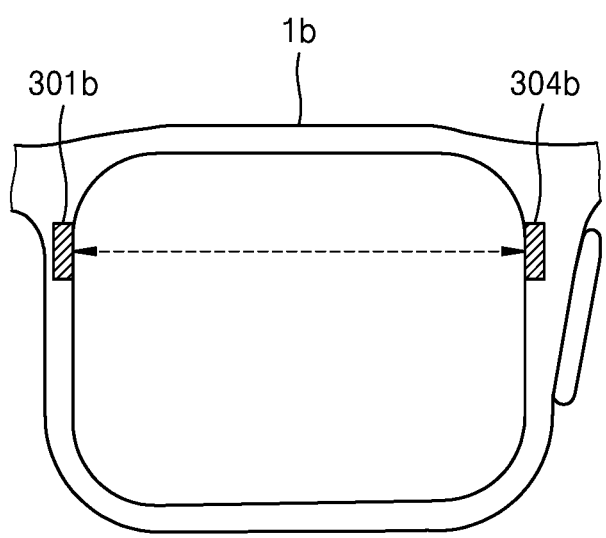
FIG. 18B is a view for explaining an arrangement example of a light source module and a DVS camera module, according to an embodiment.

As another example, as shown in FIG. 18B, a second light source module 301b may be arranged on a left upper portion of a frame 1b, and a second DVS camera module 304b may be arranged on a right upper portion of the frame 1b.

According to an embodiment, when the second DVS camera module 304b is built on an upper portion of the frame 1b, even when the upper frame of the frame 1b becomes thicker, disturbance in the view by a frame when the user has worn the glasses-type wearable device 1 may be minimized.

Figure 18C:
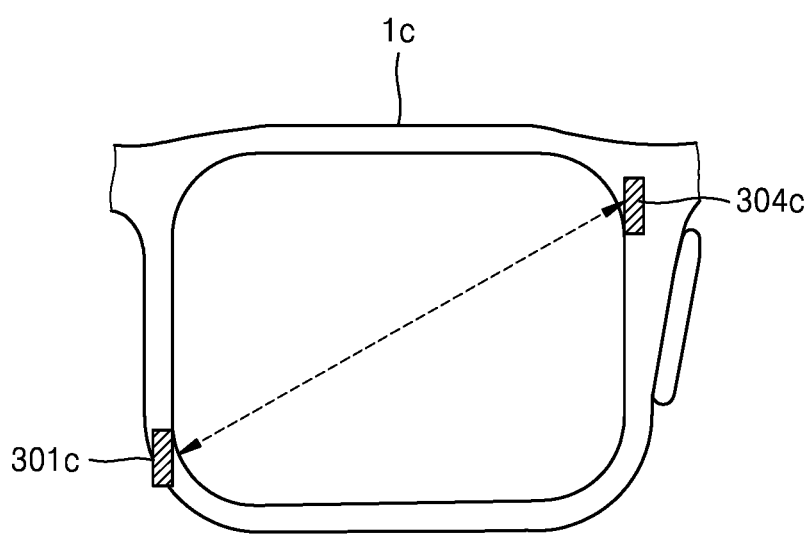
FIG. 18C is a view for explaining an arrangement example of a light source module and a DVS camera module, according to an embodiment.

As another example, as shown in FIG. 18C, a third light source module 301c may be arranged on a left lower portion of a frame 1c, and a third DVS camera module 304c may be arranged on a right upper portion of the frame 1c.

Figure 18D:
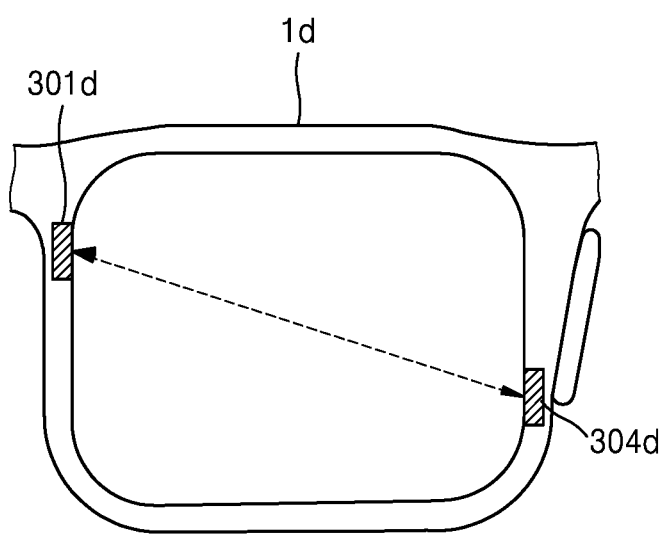
FIG. 18D is a view for explaining an arrangement example of a light source module and a DVS camera module, according to an embodiment.

As another example, as shown in FIG. 18D, a fourth light source module 301d may be arranged on a left upper portion of a frame 1d, and a fourth DVS camera module 304d may be arranged on a right lower portion of the frame 1d.

According to an embodiment, when the fourth light source module 301d is built on an upper portion of the frame 1d, even when the upper frame of the frame 1d becomes thicker, disturbance in the view by a frame when the user has worn the glasses-type wearable device 1 may be minimized.

FIGS. 18A through 18D are views for explaining examples in which a light source module and a DVS camera module may be arranged, but embodiments are not limited thereto.

FIG. 19 is a block diagram of the eye tracking apparatus 100 according to an embodiment.

As shown in FIG. 19, the eye tracking apparatus 100 according to an embodiment may include the light source module 301 and the DVS camera module 304, the light source module 301 including the light source 302 and the scanning mirror 303.

More or less components than those illustrated in FIG. 19 may be included in the eye tracking apparatus 100.

The light source module 301 according to an embodiment may include the light source 302 and the scanning mirror 303.

The light source 302 according to an embodiment may provide light. For example, the light source 302 may include an IR LED.

The scanning mirror 303 according to an embodiment may control a projection direction of the light (for example, IR light) provided by the light source 302.

According to an embodiment, the light source module 301 may provide the light provided by the light source 302 toward an eye region of a user while changing the direction of the light at intervals of a predetermined time period under the control of the scanning mirror 303.

According to an embodiment, the light source module 301 may provide light so that the light travels from the light source 302 to the eye region of the user, without changing the direction of the light, under the control of the scanning mirror 303.

The DVS camera module 304 according to an embodiment may include a camera module implemented as a DVS. The DVS camera module 304 according to an embodiment generates image data according to a variation in sensed light, and does not perform data processing when there are no variations (or no variations greater than a threshold) in the sensed light.

The DVS camera module 304 according to an embodiment may generate a DVS image, based on a variation in the amount of light reflected by the eye region of the user.

FIG. 20 is a block diagram of a wearable device including an eye tracking apparatus, according to an embodiment.

According to an embodiment, the glasses-type wearable device 1 may be, but is not limited to, a VR apparatus including a communication function and a data processing function and providing a VR image or an AR apparatus including a communication function and a data processing function and providing an AR image.

Referring to FIG. 20, the wearable device 1 according to an embodiment may include the eye tracking apparatus 100, the processor 120, the memory 130, a display 140, and a communication interface 180.

All of the components illustrated in FIG. 20 are not essential components of the wearable device 1. More or less components than those illustrated in FIG. 20 may be included in the wearable device 1.

According to an embodiment, the processor 120 may control all operations of the wearable device 1. The processor 120 according to an embodiment may execute one or more programs stored in the memory 130.

The memory 130 may store various pieces of data, programs, or applications for driving and controlling the wearable device 1. A program stored in the memory 130 may include at least one instruction. A program (one or more instructions) or application stored in the memory 130 may be executed by the processor 120.

The memory 130 according to an embodiment may store a program for processing and control of the processor 120, and may also store pieces of input/output data (for example, a virtual input interface, data input via the virtual input interface, sensing information measured by a sensor, and content). The program stored in the memory 130 may be classified into a plurality of modules according to their functions.

The memory 130 may include at least one type of storage medium among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), a magnetic memory, a magnetic disk, and an optical disk. The wearable device 1 may operate a web storage or a cloud server on the internet which performs a storage function of the memory 130. The memory 130 according to an embodiment may store various pieces of data, programs, or applications for driving and controlling the eye tracking apparatus 100.

The processor 120 according to an embodiment may control an operation of the eye tracking apparatus 100 by executing the program stored in the memory 130.

The processor 120 according to an embodiment may detect a boundary point of the cornea of the user's eye from the DVS image generated by the DVS camera module 304.

The processor 120 may filter output a peripheral region outside the cornea region from the DVS image, based on the detected cornea region. The processor 120 may detect a pupil region of the user's eye from the DVS image, based on the detected cornea region.

The processor 120 may store the detected cornea region and the detected pupil region in the memory 130. As the positions of the detected cornea region and the detected pupil region change, the processor 120 may update the changed positions and store the changed positions in the memory 130.

As no pupil regions are detected from the DVS image, the processor 120 may estimate a current position of the pupil region, based on the position of the pupil region stored in the memory 130.

The processor 120 may determine the direction of the view of the eye, based on the positions of the cornea region and the pupil region. The processor 120 may store the positions of the cornea region and the pupil region and the determined direction of view in the memory 130.

As an operation of providing light from the light source 302 toward an eye region while changing the direction of the light under the control of the scanning mirror 303, the processor 120 may track a change in the direction of view of the user's eye.

The display 140 according to an embodiment may output information processed by the processor 120. For example, the display 140 may display a virtual object.

According to an embodiment, the display 140 may provide an AR image. According to an embodiment, the display 140 may include a waveguide and a display module. The waveguide may include a transparent material that enables at least partial region of a rear surface to be visible when a user wears the wearable device 1. The waveguide may be configured as a flat plate of a single layer or multilayer structure of the transparent material through which light may be reflected therein and propagated. The waveguide may face an emission surface of the display module to receive light of a projected virtual image from the display module. Here, the transparent material includes a material through which light may pass, and transparency thereof may not necessarily be 100% and may have a certain color.

According to an embodiment, because the waveguide includes the transparent material, the user may not only view a virtual object of the virtual image through the display 140 but also view an external scene (e.g., real-world scene around the user). Thus, the waveguide may be referred to as a see-through display. The display 140 may provide an AR image by outputting the virtual object of the virtual image through the waveguide.

Figure 21:
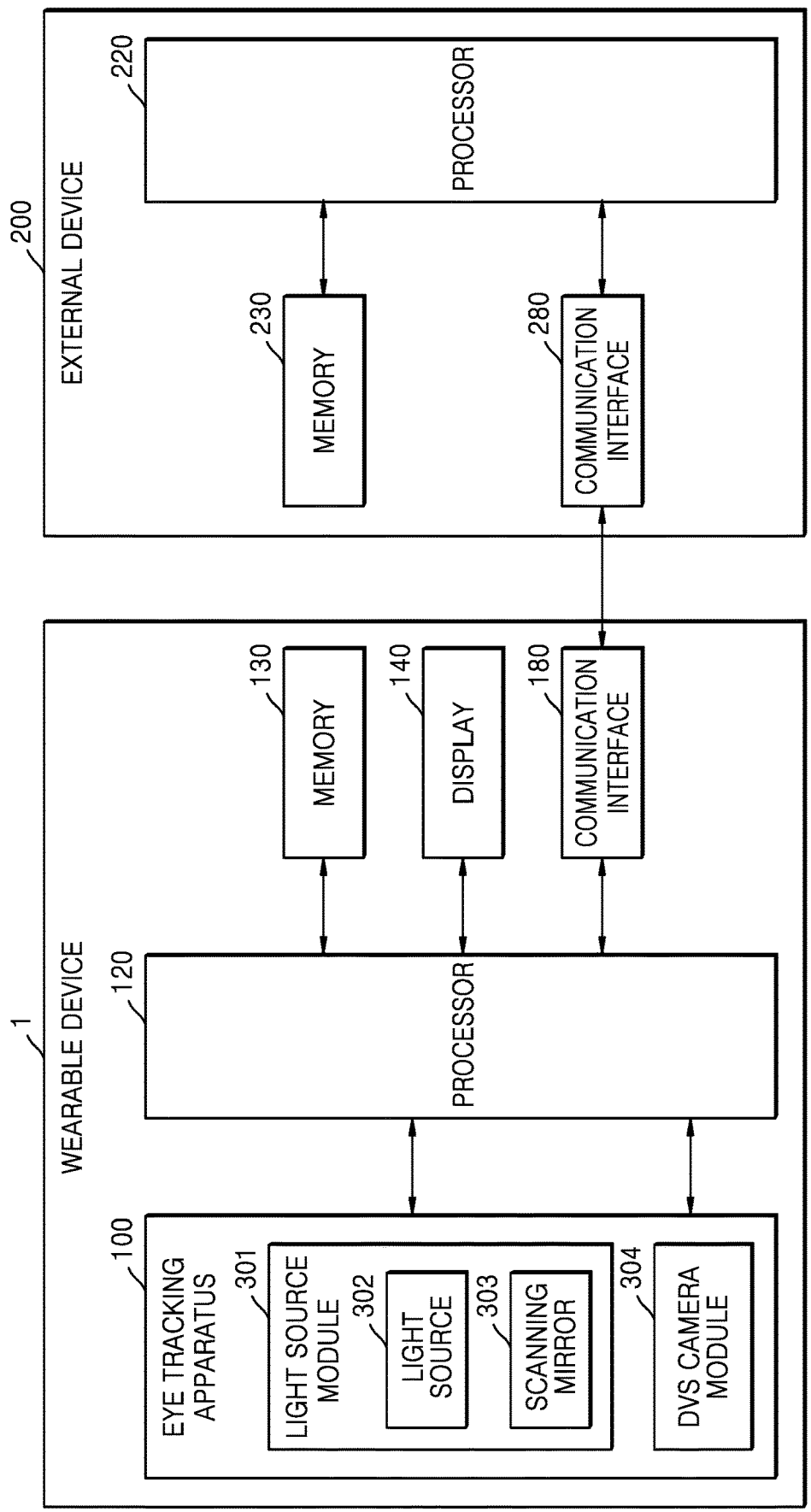
FIG. 21 is a block diagram of a wearable device and an external device, according to an embodiment.

The communication interface 180 may include at least one component that enables the wearable device 1 to communicate with an external device 200 of FIG. 21 or a server.

For example, the communication interface 180 may include a short-range communication interface and a mobile communication interface.

Examples of the short-range communication interface may include, but are not limited to, a Bluetooth communication interface, a short-range wireless communication interface (e.g., a near field communication/radio-frequency identification (RFID) communication interface), a WLAN (i.e., WiFi) communication interface, a Zigbee communication interface, an infrared Data Association (IrDA) communication interface, an ultra wideband (UWB) communication interface, an Ant+ communication interface, and the like.

The mobile communication interface may exchange a wireless signal with at least one from a base station, an external terminal, and a server on a mobile communication network. Here, examples of the wireless signal may include a voice call signal, a video call signal, and various types of data according to text/multimedia messages transmission.

According to an embodiment, the wearable device 1 may transmit a DVS image to the external device 200 of FIG. 21 via the communication interface 180. Accordingly, the external device 200 may detect the cornea and the pupil of the user's eye from the DVS image and may determine the view of the user.

According to an embodiment, the wearable device 1 may receive information about positions of the cornea and pupil of the user detected by the external device 200 of FIG. 21 and information about the view from the external device 200 of FIG. 21 via the communication interface 180.

FIG. 21 is a block diagram of the wearable device 1 and the external device 200 according to an embodiment.

According to an embodiment, the wearable device 1 may operate in connection with the external device 200. The wearable device 1 may transmit the DVS image to the external device 200, and the external device 200 may determine the cornea and pupil positions from the DVS image and provide a result of eye tracking to the wearable device 1.

The components of the wearable device 1 of FIG. 21 may correspond to those of the wearable device 1 of FIG. 20, and thus descriptions thereof will be omitted.

The external device 200 of FIG. 21 may include a processor 220, a memory 230, and a communication interface 280. However, all of the components illustrated in FIG. 21 are not essential components of the external device 200. More or less components than those illustrated in FIG. 21 may be included in the external device 200.

The processor 220 according to an embodiment may entirely control the external device 200. The processor 220 according to an embodiment may execute one or more programs stored in the memory 230.

The memory 230 according to an embodiment may store various pieces of data, programs, or applications for driving and controlling the external device 200. A program stored in the memory 230 may include at least one instruction. The program (one or more instructions) or application stored in the memory 230 may be executed by the processor 220.

The memory 230 according to an embodiment may store a program for processing and control of the processor 220, and may also store pieces of input/output data (for example, a virtual input interface, data input via the virtual input interface, sensing information measured by a sensor, and content). The programs stored in the memory 230 may be classified into a plurality of modules according to their functions.

The communication interface 280 may include one or more components that enable communication between the external device 200 and the eye tracking apparatus 100 or between the external device 200 and a server.

For example, the communication interface 280 may include a short-range communication interface and a mobile communication interface.

Examples of the short-range communication interface may include, but are not limited to, a Bluetooth communication interface, a short-range wireless communication interface (e.g., a near field communication/radio-frequency identification (RFID) communication interface), a WLAN (i.e., WiFi) communication interface, a Zigbee communication interface, an infrared Data Association (IrDA) communication interface, an ultra wideband (UWB) communication interface, an Ant+ communication interface, and the like.

The mobile communication interface may exchange a wireless signal with at least one selected from a base station, an external terminal, and a server on a mobile communication network. Here, examples of the wireless signal may include a voice call signal, a video call signal, and various types of data according to text/multimedia messages transmission.

According to an embodiment, the external device 200 may receive the DVS image from the wearable device 1 via the communication interface 280. Accordingly, the processor 220 of the external device 200 may detect the cornea region and the pupil region of the user's eye from the DVS image and may determine the view of the user.

The external device 200 may transmit information about the determined view of the user to the wearable device 1 via the communication interface 280.

The above-described embodiments may be written as computer programs and may be implemented in general-use digital computers that execute the programs using a computer readable recording medium. A structure of the data used in the above-described embodiments may be recorded in a computer readable recording medium in several ways. The above-described embodiments may also be embodied as a storage medium including computer-executable instruction codes such as computer-executable program modules. For example, when software modules or algorithms are involved, these software modules may be stored as codes or program instructions which may be read and executed by a computer in a computer-readable recording medium.

A computer readable medium may be any recording medium which may be accessed by the computer and includes any volatile and/or non-volatile medium and a removable and/or non-removable medium. Examples of the computer readable recording medium include, but are not limited to, magnetic storage media (e.g., ROM, floppy disks, hard disks, etc.), optical recording media (e.g., CD-ROMs, or DVDs), etc. Further, the computer readable medium may include all computer storage and communication media.

A plurality of computer readable recording media may be distributed over network coupled computer systems, and data stored in the distributed recording media, for example, program instruction words and codes, may be executed by at least one computer.

The particular implementations shown and described herein are merely illustrative embodiments and are not intended to otherwise limit the scope of embodiments in any way. For the sake of brevity, conventional electronics, control systems, software development and other functional aspects of the systems may not be described in detail.

Although the embodiments have been disclosed for illustrative purposes, one of ordinary skill in the art will appreciate that diverse variations and modifications are possible, without changing the technical spirit or essential features. Thus, the above embodiments should be understood not to be restrictive but to be illustrative, in all aspects. For example, respective elements described in an integrated form may be dividedly used, and the divided elements may be used in a state of being combined.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

What is claimed is:

1. A wearable device comprising:
   a light source module comprising a light source and a scanning mirror, the light source configured to provide light toward an eye region of a user and the scanning mirror configured to control to change a direction of the light from the light source toward the eye region at intervals of a predetermined time period;
   a dynamic vision sensor (DVS) camera module configured to sense a difference between a first amount of light reflected by a first point of the eye region and a second amount of light reflected by a boundary point of a cornea region of the user, which is adjacent to the first point, as the direction of the light from the light source to the eye region is changed over time, and generate an image representing the sensed difference between the first amount of light and the second amount of light; and
   a processor configured to detect the boundary point of the cornea region of the user based on the sensed difference, represented in the image, being equal to or greater than a certain magnitude.

2. The wearable device of claim 1, wherein the processor is further configured to detect a movement of the cornea region by using a plurality of images consecutively generated by the DVS camera module based on variations in an amount of light reflected from one or more points of the eye region.

3. The wearable device of claim 2, wherein the processor is further configured to track a change in a position of the detected cornea region based on the plurality of images consecutively generated by the DVS camera module.

4. The wearable device of claim 1, wherein the processor is further configured to detect a pupil region of the user from the image, based on the detected cornea region.

5. The wearable device of claim 1, wherein the processor is further configured to filter a peripheral region outside the cornea region from the image based on the detected cornea region.

6. The wearable device of claim 4, wherein the processor is further configured to:
store a position of the detected pupil region in a memory, and
based on a change in the position of the detected pupil region, update the position of the detected pupil region and store the updated position in the memory.

7. The wearable device of claim 6, wherein the processor is further configured to, based on the pupil region not being detected in the image, estimate a current position of the pupil region, based on the position of the pupil region stored in the memory.

8. The wearable device of claim 4, wherein the processor is further configured to:
determine a direction of a view of an eye based on a position of the cornea region and the position of the pupil region, and
store the position of the cornea region, the position of the pupil region, and the determined direction of the view in a memory.

9. The wearable device of claim 8, wherein the processor is further configured to track a change in the direction of the view based on a plurality of images consecutively generated by the DVS camera module.

10. A method of operating a wearable device, the method comprising:
providing light from a light source toward an eye region of a user while changing a direction of the light at intervals of a predetermined time period by using a scanning mirror; and
sensing a difference between a first amount of light reflected by a first point of the eye region and a second amount of light reflected by a boundary point of a cornea region of the user, which is adjacent to the first point, as the direction of the light from the light source to the eye region is changed over time, and generate an image representing the sensed difference between the first amount of light and the second amount of light; and
detecting the boundary point of the cornea region of the user based on the sensed difference, represented in the image, being equal to or greater than a certain magnitude.

11. The method of claim 10, further comprising detecting a movement of the cornea region by using a plurality of images consecutively generated by the DVS camera module based on variations in an amount of light reflected from one or more points of the eye region.

12. The method of claim 11, further comprising tracking a change in a position of the detected cornea region, based on the plurality of images consecutively generated by the DVS camera module.

13. The method of claim 10, further comprising detecting a pupil region of the user from the image, based on the detected cornea region.

14. The method of claim 13, further comprising:
storing a position of the detected pupil region in a memory; and
based on a change in the position of the detected pupil region, updating the position of the detected pupil region and storing the updated position in the memory.

15. The method of claim 14, further comprising, based on the pupil region not being detected from the image, estimating a current position of the pupil region, based on the position of the pupil region stored in the memory.

16. The method of claim 14, further comprising:
determining a direction of a view of an eye, based on a position of the cornea region and the position of the pupil region, and
storing the positions of the cornea region and the pupil region and the determined direction of the view in the memory.

17. The method of claim 10, further comprising filtering a peripheral region outside the cornea region from the image based on the detected cornea region.

18. The wearable device of claim 1, wherein the scanning mirror is further configured to change the direction of the light by controlling to change a direction in which the light is projected from the light source toward the eye region along at least one of a longitudinal straight line, a transverse straight line, or a Lissajous curve.

19. The method of claim 10, wherein the providing the light comprises providing the light from the light source toward the eye region of the user while changing, by using the scanning mirror, a direction in which the light is projected from the light source toward the eye region along at least one of a longitudinal straight line, a transverse straight line, or a Lissajous curve.

* * * * *